US008749504B2

(12) United States Patent
Kolokowsky et al.

(10) Patent No.: US 8,749,504 B2
(45) Date of Patent: Jun. 10, 2014

(54) METHODS AND APPARATUS TO DETERMINE POSITION ERROR OF A CALCULATED POSITION

(75) Inventors: Steve Kolokowsky, San Diego, CA (US); Vasyl Mandziy, Shchyrec Vil. (UA); Oleksandr Karpin, Lviv (UA); Yuriy Boychuk, Lviv (UA)

(73) Assignee: Cypress Semiconductor Corporation, San Jose, CA (US)

( * ) Notice: Subject to any disclaimer, the term of this patent is extended or adjusted under 35 U.S.C. 154(b) by 345 days.

(21) Appl. No.: 13/215,941

(22) Filed: Aug. 23, 2011

(65) Prior Publication Data
US 2012/0050221 A1 Mar. 1, 2012

Related U.S. Application Data

(60) Provisional application No. 61/376,368, filed on Aug. 24, 2010.

(51) Int. Cl.
*G06F 3/041* (2006.01)

(52) U.S. Cl.
USPC .......................................... 345/173

(58) Field of Classification Search
CPC .................................................. G06F 3/0317
USPC .................... 345/173–179; 178/18.01–18.11, 178/19.01–19.07, 20.01–20.04
See application file for complete search history.

(56) References Cited

U.S. PATENT DOCUMENTS

| 5,283,559 | A  | * | 2/1994  | Kalendra et al. | 345/168 |
|-----------|----|---|---------|-----------------|---------|
| 6,977,646 | B1 | * | 12/2005 | Hauck et al.    | 345/173 |
| 2008/0170046 | A1 |  | 7/2008 | Rimon et al.   |         |
| 2008/0225017 | A1 | * | 9/2008 | Kim et al.     | 345/175 |
| 2011/0074699 | A1 | * | 3/2011 | Marr et al.    | 345/173 |

FOREIGN PATENT DOCUMENTS

| JP | 2005038221 A | 2/2005 |
| JP | 2005512197 A | 4/2005 |

OTHER PUBLICATIONS

International Search Report for International Application No. PCT/US2011/048703 dated Mar. 27, 2012; 5 pages.
International Written Opinion for International Application No. PCT/US2011/048703 dated Mar. 27, 2012; 4 pages.

* cited by examiner

*Primary Examiner* — Waseem Moorad

(57) ABSTRACT

A method and apparatus receive a plurality of signals that are used to calculate a position of a conductive object relative to a capacitive sensor element and determine an estimated position error through the plurality of signals, the estimated position error to offset a position error of the calculated position.

19 Claims, 14 Drawing Sheets

| CALCULATED POSITION | AVERAGE VELOCITY (POSITIONS/S) | VELOCITY AT CALCULATED POSITION (POSITIONS/S) | ESTIMATED POSITION ERROR (POSITIONS) |
|---|---|---|---|
| 40 | 24.79 | 24.79 | 0.00 |
| 41 | 24.79 | 25.09 | 0.30 |
| 42 | 24.79 | 25.25 | 0.46 |
| 43 | 24.79 | 25.52 | 0.73 |
| 44 | 24.79 | 25.81 | 1.01 |
| 45 | 24.79 | 25.92 | 1.13 |
| 46 | 24.79 | 26.25 | 1.46 |
| 47 | 24.79 | 26.51 | 1.72 |
| 48 | 24.79 | 26.73 | 1.94 |
| 49 | 24.79 | 27.02 | 2.23 |
| 50 | 24.79 | 27.19 | 2.40 |
| 51 | 24.79 | 26.99 | 2.20 |
| 52 | 24.79 | 26.73 | 1.94 |
| 53 | 24.79 | 26.50 | 1.71 |
| 54 | 24.79 | 26.29 | 1.50 |
| 55 | 24.79 | 26.02 | 1.23 |
| 56 | 24.79 | 25.74 | 0.95 |
| 57 | 24.79 | 25.57 | 0.78 |
| 58 | 24.79 | 25.27 | 0.48 |
| 59 | 24.79 | 25.08 | 0.28 |
| 60 | 24.79 | 24.79 | 0.00 |
| 61 | 24.79 | 24.52 | 0.27 |
| 62 | 24.79 | 24.30 | 0.49 |
| 63 | 24.79 | 24.00 | 0.79 |
| 64 | 24.79 | 23.85 | 0.94 |
| 65 | 24.79 | 23.54 | 1.25 |
| 66 | 24.79 | 23.31 | 1.48 |
| 67 | 24.79 | 23.04 | 1.76 |
| 68 | 24.79 | 22.81 | 1.98 |
| 69 | 24.79 | 22.61 | 2.18 |
| 70 | 24.79 | 22.52 | 2.28 |
| 71 | 24.79 | 22.70 | 2.09 |
| 72 | 24.79 | 22.85 | 1.94 |
| 73 | 24.79 | 23.04 | 1.76 |
| 74 | 24.79 | 23.27 | 1.52 |
| 75 | 24.79 | 23.63 | 1.16 |
| 76 | 24.79 | 23.80 | 0.99 |
| 77 | 24.79 | 24.01 | 0.78 |
| 78 | 24.79 | 24.28 | 0.51 |
| 79 | 24.79 | 24.51 | 0.28 |
| 80 | 24.79 | 24.79 | 0.00 |

*FIG. 5*

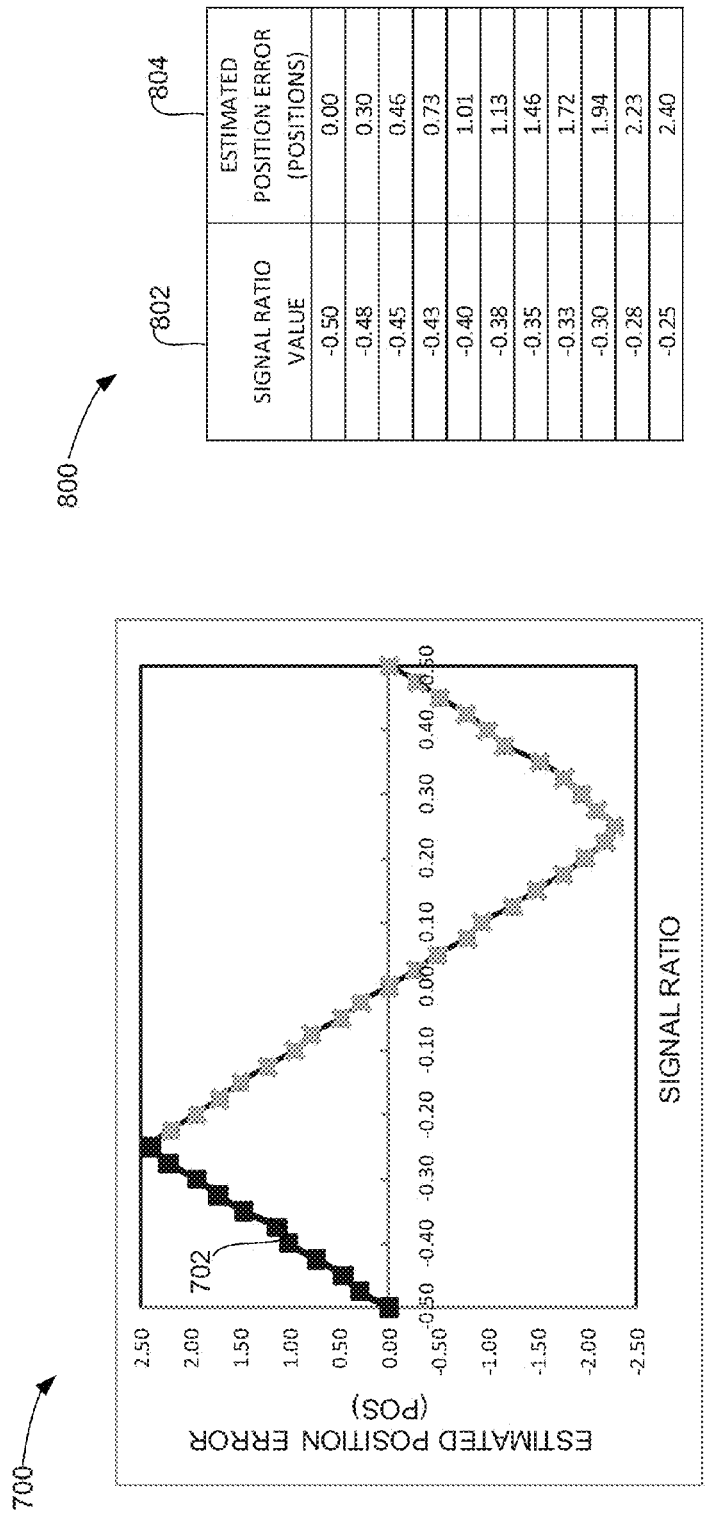

1400

| STYLUS TIP DIAMTER (MM) | SIGNAL ADJUSTMENT FACTOR | AVERAGE POSITION ERROR ASSOCIATED WITH CAPACITIVE SENSOR ELEMENTS IN ADJACENT SCANNED ZONES (MM) |
|---|---|---|
| 2 | 1 | 0.5 |
|  | 1.05/1.17 | 0.34 |

| STYLUS TIP DIAMTER (MM) | POSITION ADJUSTMENT | AVERAGE POSITION ERROR ASSOCIATED WITH NON-EDGE CAPACITIVE SENSOR ELEMENTS (MM) |
|---|---|---|
| 1.5 | WITHOUT | 0.49 |
|  | WITH | 0.306 |
| 2 | WITHOUT | 0.465 |
|  | WITH | 0.269 |
| 2.5 | WITHOUT | 0.468 |
|  | WITH | 0.245 |
| 3 | WITHOUT | 0.337 |
|  | WITH | 0.18 |

FIG. 15

METHODS AND APPARATUS TO DETERMINE POSITION ERROR OF A CALCULATED POSITION

RELATED APPLICATIONS

This application claims the priority benefit of U.S. Provisional Application No. 61/376,368, filed Aug. 24, 2010, which is incorporated herein by reference in its entirety.

TECHNICAL FIELD

The subject matter relates to the field of interpreting user input. More specifically, but not by way of limitation, the claimed subject matter discloses techniques for determining position error of a calculated position.

BACKGROUND

Computing devices, such as notebook computers, personal digital assistants, mobile communication devices, portable entertainment devices (e.g., handheld video game devices, multimedia players), and set-top-boxes (e.g., digital cable boxes, digital video disc (DVD) players) may include user interface devices that facilitate interaction between a user and the computing device.

One type of user interface device that has become more common is a touch-sensor device or touch input device that operates by way of capacitance sensing. A touch-sensor device may be in the form of a touchscreen, touch-sensor pad, a touch-sensor slider, or touch-sensor buttons, and may include an array of one or more capacitive sensor elements. Capacitive sensing typically involves measuring a change in capacitance associated with the capacitive sensor elements to determine a presence or position of a conductive object relative to a touch input device. The conductive object may be, for example, a stylus or a user's finger.

There are various techniques for calculating the position of a conductive object, however, the calculated position of the conductive object may differ from its actual position, which can limit functionality of a touch input device and/or lead to poor user experience.

BRIEF DESCRIPTION OF THE DRAWINGS

Some embodiments are illustrated by way of example and not limitation in the figures of the accompanying drawings in which:

FIG. 5 is a chart illustrating example values used to estimate position error for a capacitive sensor element, in accordance with an embodiment;

FIG. 7 is a graph highlighting a portion of a position error profile, in accordance with an embodiment;

FIG. 8 is a table illustrating signal ratio values associated with a portion of a position error profile, in accordance with an example embodiment;

FIG. 14 is a chart showing experimental results of position error associated with a two-millimeter stylus when a signal adjustment factor has been applied to signals;

FIG. 15 is a chart showing experimental results of position error associated with multiple stylus diameters when estimated position errors have been applied to calculated positions.

DETAILED DESCRIPTION

Figure 1:
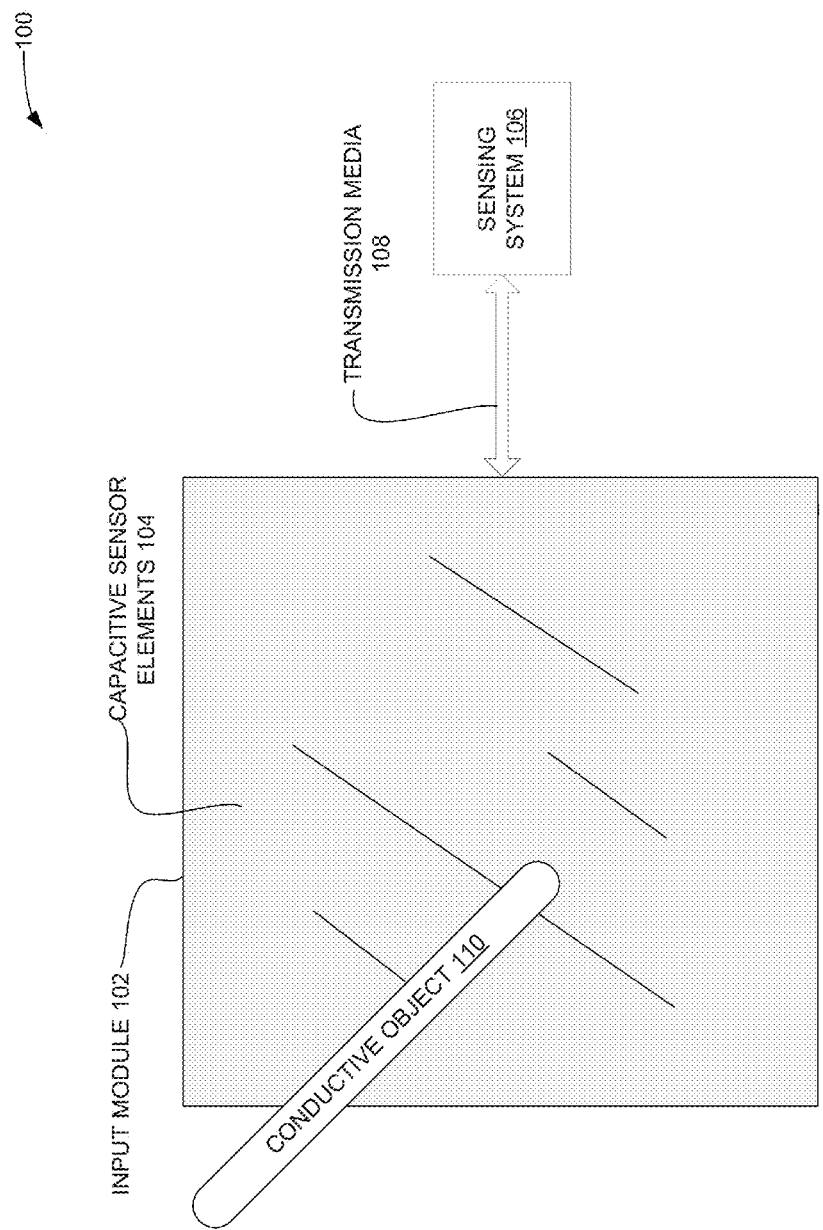
FIG. 1 is a block diagram illustrating an example capacitive sensing system, in accordance with various embodiments.

Methods and apparatus to determine position error of a calculated position are described. In the following description, for purposes of explanation, numerous specific details are set forth in order to provide a thorough understanding of example embodiments. It will be evident, however, to one skilled in the art that the claimed subject matter may be practiced without these specific details.

The detailed description discloses examples of technology that, among other things, determines position error associated with a calculated position of a conductive object relative to a capacitive sensor element. The conductive object may be a stylus, a finger, or any other conductive object that affects capacitance of a capacitive sensor element. The capacitive sensor element may be a part of a touchscreen, touchpad, or another input device from which changes in capacitance are detected.

In an embodiment, the position of a stylus tip upon a touchscreen is calculated. The diameter of the stylus tip is a number of times smaller (e.g., five times smaller) than an active area of the capacitive sensor elements employed by the touchscreen. An active area is a surface through which capacitance forming charge is exchanged. A stylus tip having for example, a one-millimeter diameter allows for user visibility of the touchscreen while providing an appropriate tool for inputting fine lines and selecting, with precision, items displayed by the touchscreen. In an embodiment, the position of the stylus tip is calculated using a centroid algorithm that takes, as input, signals reflecting changes in capacitance of the capacitive sensor elements caused by the stylus.

The calculated position of the stylus tip may include position error that depends on the size of the capacitive sensor element's active area as well as the diameter of the stylus tip. The amount of position error may vary periodically along the active area (e.g., a length of the active area) of each capacitive sensor element. One way to determine position error is to find a difference between a reference position and a calculated position. The reference position may be measured using a Cartesian robot.

Embodiments described herein include estimating position errors associated with calculated positions. In an embodiment, an estimated position error is determined by calculating a difference between the average velocity of the stylus tip over multiple calculated positions and the velocity of the stylus tip at a calculated position.

Determining the position error as just described avoids the use of a Cartesian robot to obtain the position error values. Compared to the relatively expensive and not readily portable Cartesian robot, embodiments described herein are more versatile because position error can be relatively quickly determined by a human or computer user, in the field, without external position measurements, and at a relatively lower cost.

The position error or estimated position error associated with a capacitive sensor element may be referred to as position error profile of the capacitive sensor element. A position error profile may be stored so that when a position of the stylus is calculated, the estimated position error associated with that position can be retrieved. In an embodiment, the position error profile of one capacitive sensor element is used as the position error profile of other capacitive sensor elements. Doing so avoids using resources to store position error information for more than one capacitive sensor element. Stored position error values of the position error profile may indexed by index values associated with the multiple capacitive sensor elements such that the position error for any of the capacitive sensor elements can be accessed.

Where the position error profile includes position error values that are periodic across the capacitive sensor element, storage requirements can be further minimized by storing only a portion (e.g., one quarter) of the position error values. These position error values along with the index values described above can be used to determine the value and sign of the position error associated with a calculated position.

Position error values, no matter how determined may in some embodiments be approximated using a periodic function. An example periodic function may have an amplitude that is proportional to both the resolution of the touchscreen (e.g., along a coordinate axis) and the active area for a capacitive sensor element of the touchscreen. In an embodiment, the example periodic function uses the calculated position as an input and the output of the periodic function can be placed in memory to be applied to a subsequent calculated position. In an embodiment, the example periodic function may be calculated "on the fly" to estimate the position error associated with a current calculated position. In this embodiment, the use of storage resources to store position error values may be avoided.

The detailed description includes references to the accompanying drawings, which form a part of the detailed description. The drawings show illustrations in accordance with example embodiments. These embodiments, which are also referred to herein as "examples," are described in enough detail to enable those skilled in the art to practice embodiments of the invention. The embodiments may be combined, other embodiments may be utilized, or structural, logical, and electrical changes may be made without departing from the scope of what is claimed. The following detailed description is, therefore, not to be taken in a limiting sense, and the scope is defined by the appended claims and their equivalents.

FIG. 1 is a block diagram illustrating an example capacitive sensing system 100, in accordance with various embodiments. The capacitive sensing system 100 is shown to include an input module 102 coupled to a sensing module 106. A conductive object 110 is shown to interact with the capacitive sensing system 100. The capacitive sensing system 100 is to detect the presence and/or a calculated position of the conductive object 110.

In various embodiments, the capacitive sensing system 100 may provide the functionality of a touchscreen, a touchpad, a slider, a button, a switch, a level sensor, a proximity sensor, a displacement sensor, a combination thereof, or provide some other functionality based on a detection of the conductive object.

The input module 102 is to receive input from the conductive object 110. The input module 102 is shown to include capacitive sensor elements 104. A capacitance associated with a capacitive sensor element (e.g., of the capacitive sensor elements 104) is affected by the presence of the conductive object 110. The dimensions of the capacitive sensor elements and the conductive object determine how much the conductive object affects the capacitance. As discussed further below, the sensing module 106 uses signals reflecting changes in capacitance to determine the position of the conductive object.

In some embodiments, the input module 102 includes a touch pad, a touchscreen, or any other interface to receive input from the conductive object 110. The input module 102 may employ projected capacitive technology in which the capacitive sensor elements 104 are formed in one or more capacitive sensor layers upon a substrate (not shown) of the input module 102. For example, the capacitive sensor elements 104 may be patterned in one or more layers of transparent conducting film deposited on a glass substrate. A protective transparent layer (e.g., glass or plastic film) may cover the capacitive sensor elements to shield them from environmental damage.

The conductive object 110 is to provide input to the input module 102. The conductive object may include any object that affects a capacitance associated with the capacitive sensor elements 104. Examples of the conductive object 110 may include, but not be limited to, a finger or a stylus. In the embodiments described below, the conductive object has an end portion (e.g., stylus tip) with a diameter that is less than three millimeters in length.

The conductive object 110 may be fixed in position or moveable in position relative to the input module 102. For example, a user may move the conductive object 110 relative to the input module 102. The user may include a human, a mechanism, a machine, and/or programmed instructions. Alternatively or additionally, the input module 102 may be allowed to move relative to a fixed or movable conductive object 110.

The sensing module 106 is to sense whether the conductive object 110 is proximate to or in contact with any of the capacitive sensor elements 104 of the input module 102. To this end, the sensing module 106 may sense the effect of the conductive object 110 on a capacitance associated with the capacitive sensor elements 104.

In one embodiment, the sensing module 106 senses the conductive object 110 through comparing a capacitance of a capacitive sensor element when the conductive object 110 is not present (e.g., not proximate to or in contact with a capacitive sensor element), with the capacitance of the capacitive sensor element when the conductive object 110 is present. For some embodiments, to sense the presence of the conductive object 110, the sensing module 106 may perform a scan operation in which each of the capacitive sensor elements 104 are scanned for a change in capacitance.

In the scan operation, the sensing module 106 exchanges energy (e.g., through current) with the input module 102 through the transmission media 108. The transmission media 108 may include any medium through which the energy may be conveyed. For some embodiments, the transmission media 108 includes metal trace (e.g., copper wire) over which current can flow. Alternatively or additionally, the energy may be propagated over a wireless transmission media.

In one embodiment of a scan operation, the sensing module 106 applies a voltage to one or more of the capacitive sensor elements 104 through the transmission media 108 to form a capacitance. The sensing module 106 may alternatively or additionally detect a current or voltage resulting from a discharge of the one or more of the capacitive sensor elements 104. In various embodiments, the sensing module 106 may measure a self-capacitance of the capacitive sensor elements 104 and/or a mutual capacitance of the capacitive sensor elements 104.

For some embodiments, the sensing module 106 may process signals indicating the sensed changes in capacitance associated with a capacitive sensor to calculate position of the conductive object 110 relative to the input module 102. For example, the sensing module 106 may use the signals to determine proximity, position, displacement, movement, and/or to provide other presence related measurements associated with the conductive object 110. In embodiments described below, the sensing module estimates position error associated with the calculated position and removes the estimated position error for the calculated position. Alternatively or additionally, the sensing module 106 may provide the signals to other instructions and/or circuitry (e.g., instructions and/or circuitry of a host) to determine the positional information of the conductive object 110. Embodiments of the conductive object 110 and the capacitive sensor elements 104 of FIG. 1 are discussed in more detail with respect to FIG. 2.

Figure 2:
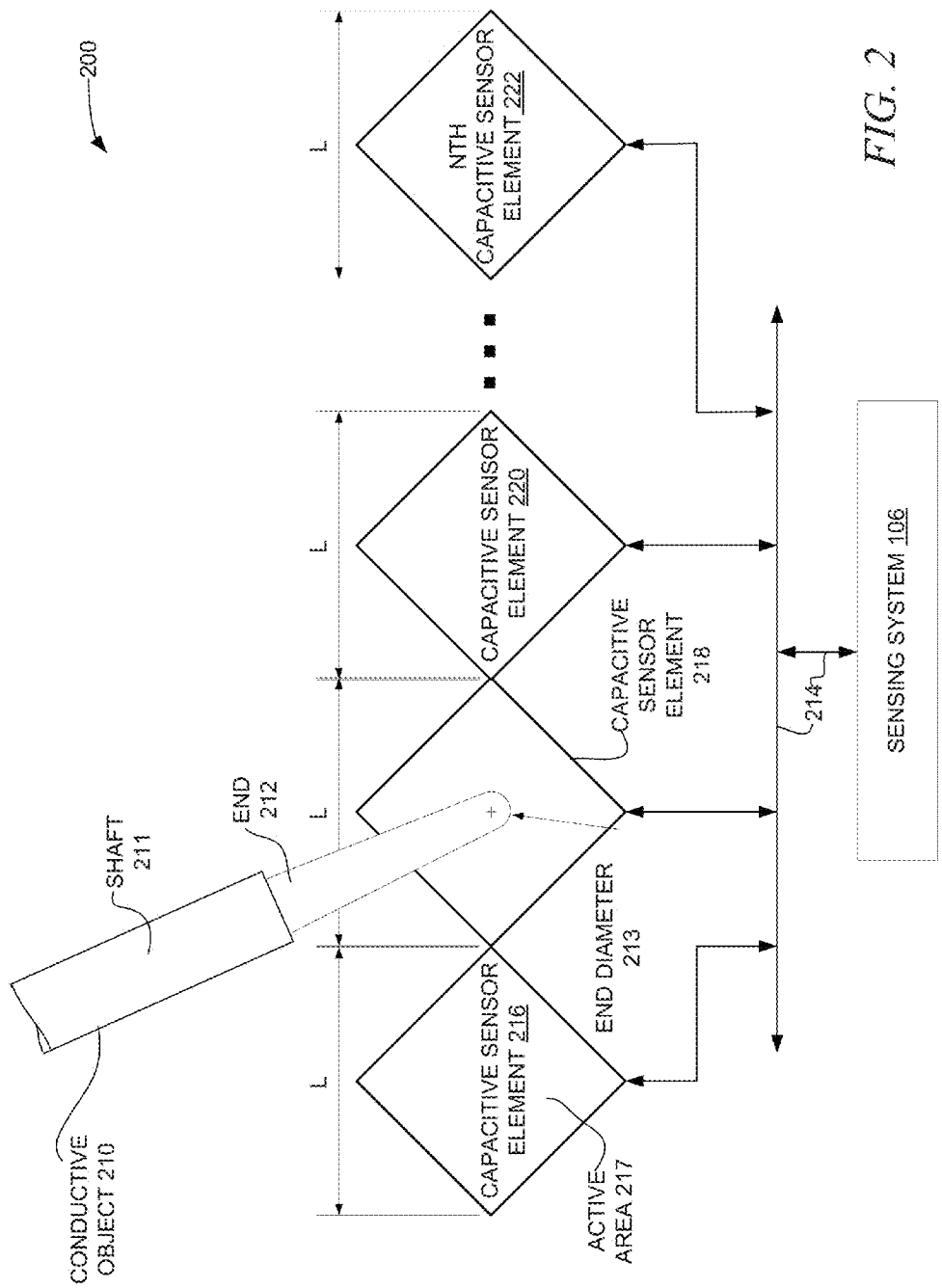
FIG. 2 is a block diagram illustrating a conductive object proximate to a capacitive sensor element of a capacitive sensing system, in accordance with an embodiment.

FIG. 2 is a block diagram illustrating a conductive object 210 proximate to a capacitive sensor element 218 of a capacitive sensing system 200, in accordance with an embodiment.

In an embodiment, the input module 102 of FIG. 1 includes numerous columns of capacitive sensor elements. FIG. 2 shows representative capacitive sensor elements 216, 218, 220, and 222 in one row of N columns of capacitive sensor elements. A capacitance of each capacitive sensor element 216, 218, 220, and 222 may change responsive to the presence of the conductive object 210. In an embodiment, the signals reflecting the changes in capacitance flow through a bus 214 to the sensing system 106 where position of the conductive object 210 is calculated.

The capacitive sensor element 216 is shown to include an active area 217, which is representative of an active area of the capacitive sensor elements 218, 220, and 222. The active area of a capacitive sensor element represents a surface area through which the capacitive sensor element can transfer charge responsive to presence of a conductive object. The transfer of the charge affects the capacitance of the capacitive sensor element.

In an embodiment, the length L of the active area 217 is used to indicate the size of the active area 217. The length of the active area 217 is shown to extend between opposite vertices of the example diamond shaped capacitive sensor element 216. Capacitive sensor elements of other shapes may used without departing from the claimed subject matter. In an embodiment, the length of the active area is around five millimeters. The length of the active area 217 is but one indicator of its size. Alternatively or additionally, indicators of size such as surface area, volume, and/or other geometrical measurements may be used to characterize active areas of capacitive sensor elements.

The conductive object 210 is shown to include a shaft 211 and an end 212. The end 212 is shown to include an end diameter 213. Some conductive objects (e.g., styluses) may have an end diameter 213 that is larger than three millimeters. The larger the end diameter, the more the conductive object obstructs a user's view of an input surface when using the conductive object to draw or select items through the input surface. The larger-sized end of the conductive object may also introduce difficulty in drawing fine lines or selecting between items that are close together on the input surface (e.g., on a touchscreen).

In various embodiments, the conductive object 210 has an end diameter 213 that is less than three millimeters, which compared to the larger end diameter described above, minimizes obstruction to the user's view of an input surface, and allows the user to input information to the input surface with finer detail and precision. Conductive objects with a smaller end diameter may also be stored using less space or footprint (e.g., onboard a touchscreen device) than conductive objects with a larger end diameter. In these embodiments, both the shaft 211 and the end 212 of the conductive object 210 may be designed to change the capacitance of capacitive sensor elements, rather than just the end 212 of the conductive object 210.

Compared to the larger end diameter, in an embodiment, the smaller end diameter causes less of a change to the capacitances of the capacitive sensors. Signals reflecting this reduced change in capacitance may be more susceptible to noise or interference (e.g., causing signal error), which can lead to presence detection errors and position calculation errors. As discussed in more detail with respect to FIG. 3, a sensing system may use these signals to calculated position of the conductive object.

Figure 3:
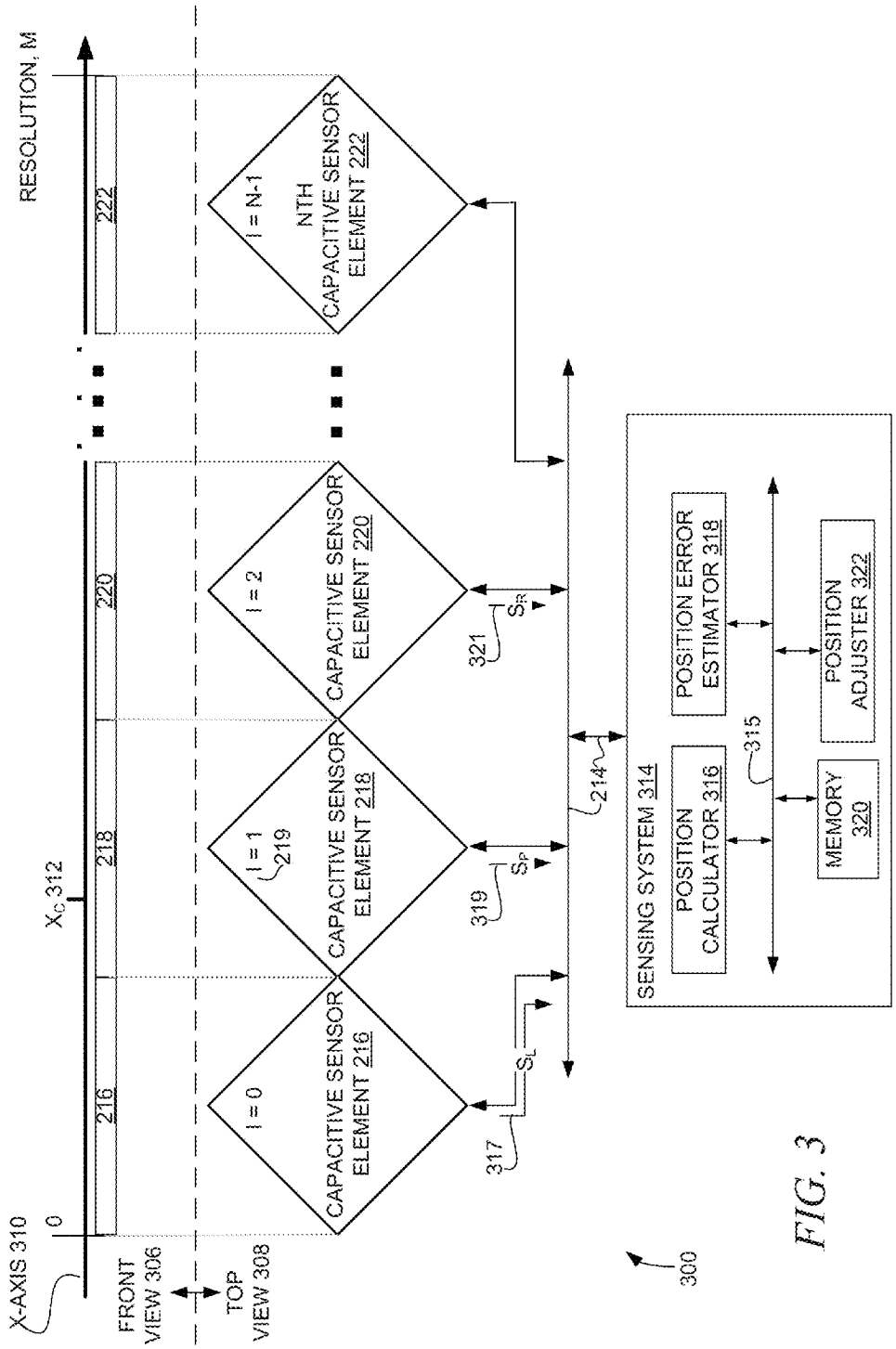
FIG. 3 is block diagram illustrating a capacitive sensing system through which a position of a conductive object is calculated, in accordance with various embodiments.

FIG. 3 is block diagram illustrating a capacitive sensing system 300 through which a position $X_C$ 312 of a conductive object is calculated, in accordance with various embodiments.

The capacitive sensor elements 216, 218, 220, and 222 of FIG. 3 are the same as or similar to those described with respect to FIG. 2. FIG. 3 shows a top view 308 of the capacitive sensor elements 216, 218, 220, and 222 and also a front view 306 of the capacitive sensor elements 216, 218, 220, and 222. Shown above the front view 306, an x-axis 310 extends horizontally from x=0 at an end of the capacitive sensor element 216 to x=M at an end of the capacitive sensor 222. The x-axis 310 is fixed relative to the capacitive sensor elements 216, 218, 220, and 222 and a number of coordinates (not shown) on the x-axis 310 are associated with each capacitive sensor element 216, 218, 220, and 222. The coordinates represent locations at which the position (e.g., the position $X_C$ 312) of a conductive object may be calculated. Alternatively or additionally, the capacitive sensor elements 216, 218, 220, and 222 and a coordinate axis may be oriented in any other direction without departing from the scope of the claimed subject matter. For example, the capacitive sensor elements 216, 218, 220, and 222 may be vertically positioned and a y-axis may extend vertically with the capacitive sensor elements 216, 218, 220, and 222.

The sensing system 314 is shown to include a position calculator 316, a position error estimator 318, a position adjuster 322, and a memory 320 coupled with one another through a bus 315.

The position calculator 316 is to calculate a position of a conductive object using signals that reflect capacitances of the capacitive sensor elements. For various embodiments, the position calculator 316 uses a centroid algorithm to calculate the position. Although signals from any number of capacitive sensor elements may be evaluated by a centroid algorithm, for the purpose of explanation and not limitation, an example 3-sensor centroid algorithm is described herein and includes the following:

$$x_c = \frac{Res}{N} \cdot \left[ i + \frac{1}{2} + \frac{Sr - Sl}{Sl + Sp + Sr} \right], \quad (1)$$

where $x_c$ represents a calculated position of a conductive object,

Res represents a resolution defined for the capacitive sensors, or a total number of positions for which a position of the conductive object can be calculated, N represents a total number of capacitive sensor elements in a row, i represents a sensor number assigned to the capacitive sensor element with a peak signal, $S_P$ (e.g., the largest signal), where i may have a value between zero and N−1, $S_R$ represents the signal of the capacitive sensor to the right of the capacitive sensor with the peak signal $S_P$, and $S_L$ represents the signal of the capacitive sensor to the left of the capacitive sensor with the peak signal $S_P$.

Referring to FIG. 3, the calculated position $X_C$ 312 is shown on the x-axis 310 above the capacitive sensor element 218. The resolution, Res of equation (1) consists of all of the coordinates or positions on the x-axis 310 from position x=0 to x=M. The ratio Res/N may also be defined as a pitch of the capacitive sensor elements 216, 218, 220, and 222. A pitch of the capacitive sensor elements 216, 218, 220, and 222 may be described as the number of positions defined (e.g., that can be calculated) for a capacitive sensor element. For example, a capacitive sensor element with a pitch of 40 is discussed below with respect to FIG. 6.

The sensing system 314 is shown to receive the peak signal $S_P$ 319 from the capacitive sensor element 218. The capacitive sensor element 218 may have the sensor number i=1 219. The sensing system 314 is shown to receive the signals $S_R$ 321 and $S_L$ 317 from the capacitive sensor element 220 and the capacitive sensor element 216, respectively.

Both the position calculated by the position calculator 316 and the position error associated with that calculated position depend on the signal ratio $$\frac{Sr - Sl}{Sl + Sp + Sr}, \quad (2)$$

in the centroid algorithm of equation (1).

The amount of position error associated with each calculated position may depend on the amount of signal error in the signals $S_R$ 321, $S_P$, 319 and $S_L$ 317, and consequently, the amount of position error depends on the signal ratio of equation (2). When the signal ratio of equation (2) cancels out all signal error, the position error is reduced to zero. For example, referring to FIG. 3: when a conductive object is positioned on the x-axis 310 exactly between the capacitive sensor elements 216 and 218, SR=0 and SL=SP and $$\frac{Sr - Sl}{Sl + Sp + Sr} = -1/2;$$

when the conductive object is positioned on the x-axis 310 in the very center of the capacitive sensor element 218, SR=SL, and $$\frac{Sr - Sl}{Sl + Sp + Sr} = 0;$$

and when the conductive object is positioned on the x-axis 310 at exactly between the capacitive sensor elements 218 and 220, SL=0 and SR=SP, and $$\frac{Sr - Sl}{Sl + Sp + Sr} = 1/2.$$

The amount of signal error in the signals $S_R$ 321, $S_P$, 319 and $S_L$ 317 depends, at least in part, on the dimensions of the conductive object (e.g., the diameter of a stylus tip) and the dimensions of the capacitive sensor elements (e.g., the size of an active area). In an embodiment, the signal error is due, at least in part, to the use of the conductive object 210 of FIG. 2 with the end diameter 213 that is less than three millimeters and capacitive sensor elements 216, 218, 220 that have the five-millimeter active area 217.

The position error estimator 318 is to estimate position error for multiple calculated positions along the x-axis 310. In various embodiments, the position error estimator 318 determines a position error profile of a capacitive sensor element (e.g., the capacitive sensor element 218). A position error profile specifies the estimated position error associated with the calculated positions of a capacitive sensor element. As will be discussed with respect to FIG. 6, the estimated position error may vary periodically over the calculated positions of the capacitive sensor element 218. As will be discussed with respect to FIG. 7, the position error profile of one capacitive sensor element (e.g., the capacitive sensor element 218) may be used as the position error profile of another capacitive sensor element (e.g., the capacitive sensor element 216, 220, or 222).

In some embodiments, the position error estimator 318 estimates the position error during a tuning mode in which multiple position error values are determined and placed in the memory 320 for later use when a subsequently calculated position is to be adjusted. Alternatively or additionally, the position error estimator 318 may determine position error "on the fly" when a currently calculated position is to be adjusted.

In some embodiments, the position error estimator 318 may estimate the position error associated with a calculated position of a conductive object before the capacitive sensing system 300 is deployed to the field (e.g., before a touchscreen is deployed as a product to an end-user). In an embodiment, position error estimator 318 determines the position error prior to field deployment by calculating a difference between a calculated position $X_C$ 312 of the conductive object (e.g., through the centroid algorithm of equation (1)) and a reference position (not shown) of the conductive object. A reference position of the conductive object may be measured independent of capacitive sensor element signals $S_R$ 321, $S_P$, 319 and $S_L$ 317 (e.g., independent of the centroid algorithm). For example, an electromechanical device such as a Cartesian robot may be programmed to move the conductive object along the x-axis 310 and measure reference positions of a conductive object relative to the x-axis 310.

Alternatively or additionally, the position error estimator 318 may estimate the position error based on comparing a calculated position $X_C$ 312 of a conductive object with an expected position of the conductive object. In this technique, the position error estimator 318 determines a difference between a velocity of the conductive object at the calculated position $X_C$ 312 and an average velocity of the conductive object over multiple calculated positions. An embodiment for determining the position error in this way, which may occur before or after field deployment, is described below with respect to FIG. 4.

The position adjuster 322 is to adjust a calculated position with an estimated position error value. For example, the position adjuster 322 may obtain the estimated position error for the calculated position $X_C$ 312 through the position error estimator 318. In an embodiment, the position adjuster 322 may use the signal ratio of equation (2) as an index to locate, in the memory 320, the estimated position error to be applied to the calculation position $X_C$ 312. In an embodiment, the position adjuster 322 adds to or subtracts from the calculation position $X_C$ 312 using the estimated position error.

Figure 4:
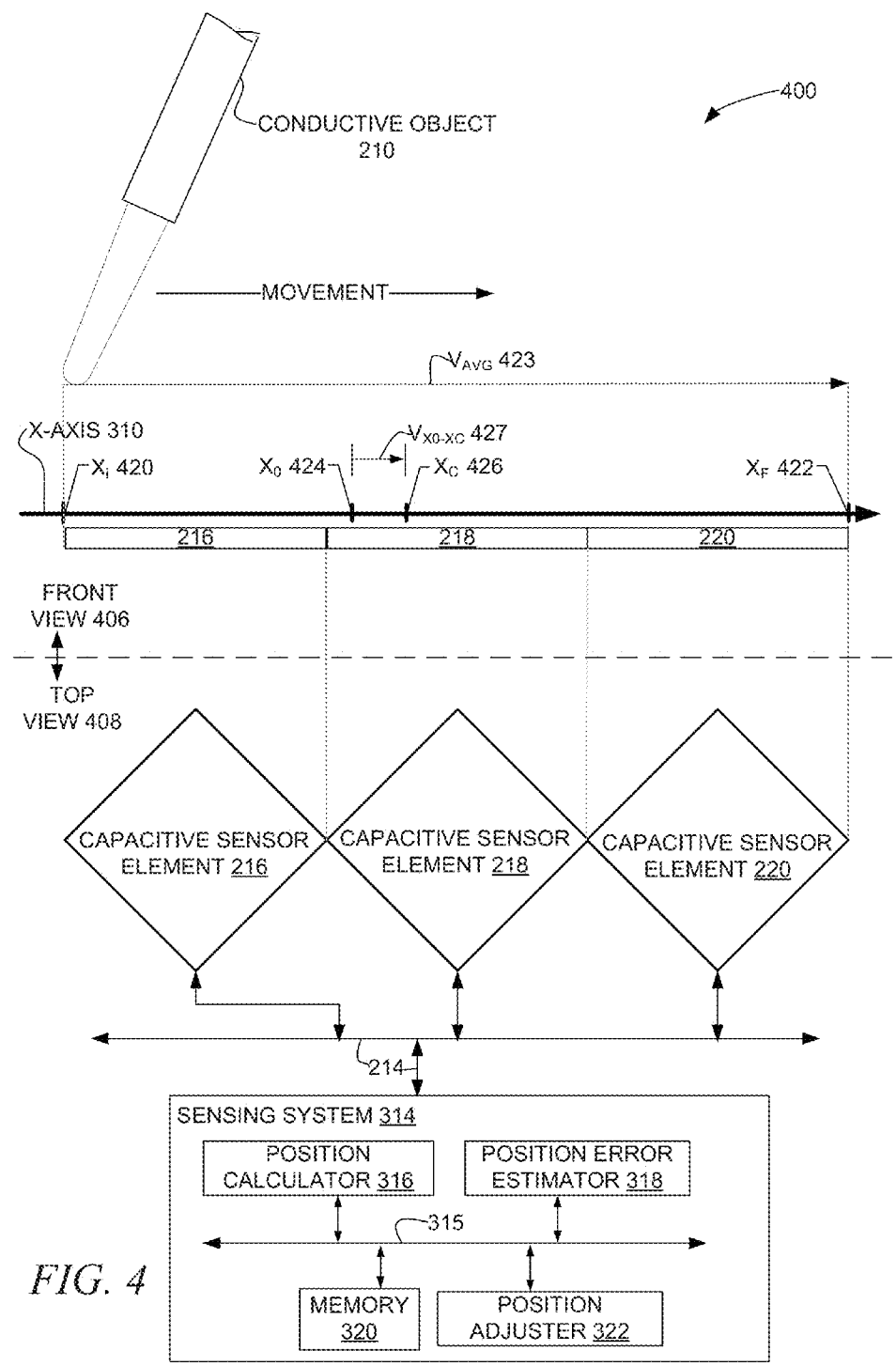
FIG. 4 is block diagram illustrating a capacitive sensing system that estimates position error of a calculated position, in accordance with various embodiments.

FIG. 4 is block diagram illustrating a capacitive sensing system 400 that estimates position error of a calculated position, in accordance with various embodiments. The capacitive sensor elements 216, 218, and 220, the x-axis 310, and the sensing system 314 of FIG. 4 are the same or similar to those discussed with respect to FIG. 3. The capacitive sensor elements 216, 218, and 220 are shown in a front view 406 and a top view 408. The conductive object 210 is the same that that described with respect to FIG. 2.

As introduced above, the position error estimator 318 may estimate the position error based on comparing a calculated position $X_C$ 426 of the conductive object 210 with an expected position of the conductive object 210. This process of estimating position error involves a user imparting movement to the conductive object 210 relative to multiple positions associated with the capacitive sensor elements 216, 218, and 220 along the x-axis 310. In an embodiment, it is assumed that a velocity of the conductive object 210 as it moves over the capacitive sensor element 218 is a constant velocity. An average velocity of the conductive object 210 can be used to represent the assumed constant velocity. In an embodiment, the estimated position error at the calculated position $X_C$ 426 is the difference between the assumed constant velocity (e.g., the average velocity) and a separately calculated velocity (e.g., a local velocity between adjacent positions) at the calculated position $X_C$ 426.

For example, as the conductive object 210 is moving, the position calculator 316 calculates multiple positions of the conductive object 210 on the x-axis 310. In one embodiment, the position calculator 316 calculates all the positions between an initial position $X_I$ 420 and a final position $X_F$ 423. The positions $X_I$ 420 and $X_F$ 423 may be located anywhere on the x-axis 310 and are not limited to the positions shown in FIG. 4. For example, the user may move the conductive object 210 across a greater or fewer numbers of positions. In an embodiment, the position calculator 316 calculates the multiple positions using the centroid algorithm of equation (1).

The position calculator 316 is to provide the calculated positions of the conductive object 210 to the position error estimator 318, which calculates the average velocity $V_{AVG}$ 423 and the velocity $V_{X0\text{-}XC}$ 427 at the calculated position $X_C$ 426. To this end, the position error estimator 318 may obtain and utilize the time it took for the conductive object 210 to travel between each of the calculated positions. In an embodiment, the position error estimator 318 discards the calculated positions and timing information near the beginning of travel and the end of travel of the conductive object 210 because the user is more likely to stray from the assumed constant velocity in these areas.

In an embodiment, the position error estimator 318 calculates the average velocity $V_{AVG}$ 423 of the conductive object 210 over the capacitive sensor element 218. The average velocity $V_{AVG}$ 423 is used to represent a constant velocity of the conductive object 210 at any of the multiple calculated positions along the capacitive sensor element 218. The position error estimator 318 also determines the velocity $V_{X0\text{-}XC}$ 427 at the calculated position $X_C$ 426. The position error estimator 318 may calculate the velocity $V_{X0\text{-}XC}$ 427 by dividing the distance between the calculated position $X_C$ 426 and the calculated position $X_0$ 424 by the time it took for the conductive object to travel between the calculated positions $X_0$ 424 and $X_C$ 426. In an embodiment, it is assumed that the calculated position $X_0$ 424 is an accurate position (e.g., without position error).

Since the conductive object is assumed to move over the calculated positions of the capacitive sensor element 218 at the average velocity $V_{AVG}$ 423 (e.g., the assumed constant velocity), the average velocity $V_{AVG}$ 423 and the velocity $V_{X0\text{-}XC}$ 427 at the calculated position $X_C$ 426 should be equal. Any difference between the average velocity $V_{AVG}$ 423 and the velocity $V_{X0\text{-}XC}$ 427 at the calculated position can be attributed to position calculation error. When it is further assumed that that the calculated position $X_0$ 424 is an accurate position, the difference between the average velocity $V_{AVG}$ 423 and the velocity $V_{X0\text{-}XC}$ 427 at the calculated position $X_C$ 426 is considered to be the estimated position error of the calculated position $X_C$ 426.

In an embodiment, the position error estimator 318 may pre-populate the memory 320 (e.g., a data structure) with the estimated position error for later access by the position adjuster 322 (e.g., when the position $X_C$ 426 is subsequently calculated). This may occur either as part of a tuning operation prior to field use or during field use. In an embodiment, the position error estimator 318 adaptively optimizes position error estimation to account for changes in the level of accuracy provided by the capacitive sensing system 400. For example, the position error estimator 318 may monitor movements of the conductive object 218 during user-operation modes and use those movements to calculate an updated average velocity that reflects the change in accuracy (e.g., increased position error). The position error estimator 318 may update the memory 320 with the updated average velocity so that it may be used to provide updated and adapted estimations of position error. Alternatively or additionally, the position error estimator 318 may provide the estimated position error to the position adjuster 322 so that a currently calculated position $X_C$ 426 can be adjusted "on the fly" when the calculated position $X_C$ 426 is provided by the position calculator 316. An example estimation of position error based on differences in velocity is discussed with respect to FIG. 5.

FIG. 5 is a chart illustrating example values used to estimate position error for a capacitive sensor element, in accordance with an embodiment. The chart is discussed with respect to FIG. 4 for the purpose of explanation and not limitation.

Column 502 is shown to include multiple calculated positions of the conductive object 210 of FIG. 4. Although not shown in FIG. 4, the calculated positions 40-80 in column 502 may represent positions on the x-axis 310 across the capacitive sensor element 218. In this embodiment, the capacitive sensor element 218 has 40 positions over its five millimeter length. Column 504 is shown to include the average velocity $V_{AVG}$ 423 of the conductive object 210 over the capacitive sensor element 218. Column 506 is shown to include a velocity of the conductive object 210 corresponding to each of the calculated positions shown in column 502. Column 508 is shown to include an estimated position error corresponding to each of the calculated positions of column 502.

Row 510 illustrates values relating to an example estimated position error. For example, to determine the estimated position error associated with the calculated position $X_C$ 426 of 43 (e.g., see column 502, row 510), the position error estimator 318 calculates the difference between the average velocity $V_{AVG}$ 423 of 24.79 positions per second (e.g., see column 504, row 510) and the velocity $V_{X0-XC}$ 427 of 25.52 positions per second at the calculated position $X_C$ 426 (e.g., see column 506, row 510). In some embodiments, the position error estimator 318 uses the absolute value of the difference in velocity to estimate position error. In this example, the difference in velocity is 0.73 positions per second, which yields an estimated position error of 0.73 positions (e.g., see column 508, row 510).

A position error profile of a capacitive sensor element characterizes the estimated position error associated with each calculated position of a capacitive sensor element. The chart 500 shows the position error profile of the capacitive sensor element 218 of FIG. 4, which is described in more detail with respect to FIG. 6.

Figure 6:
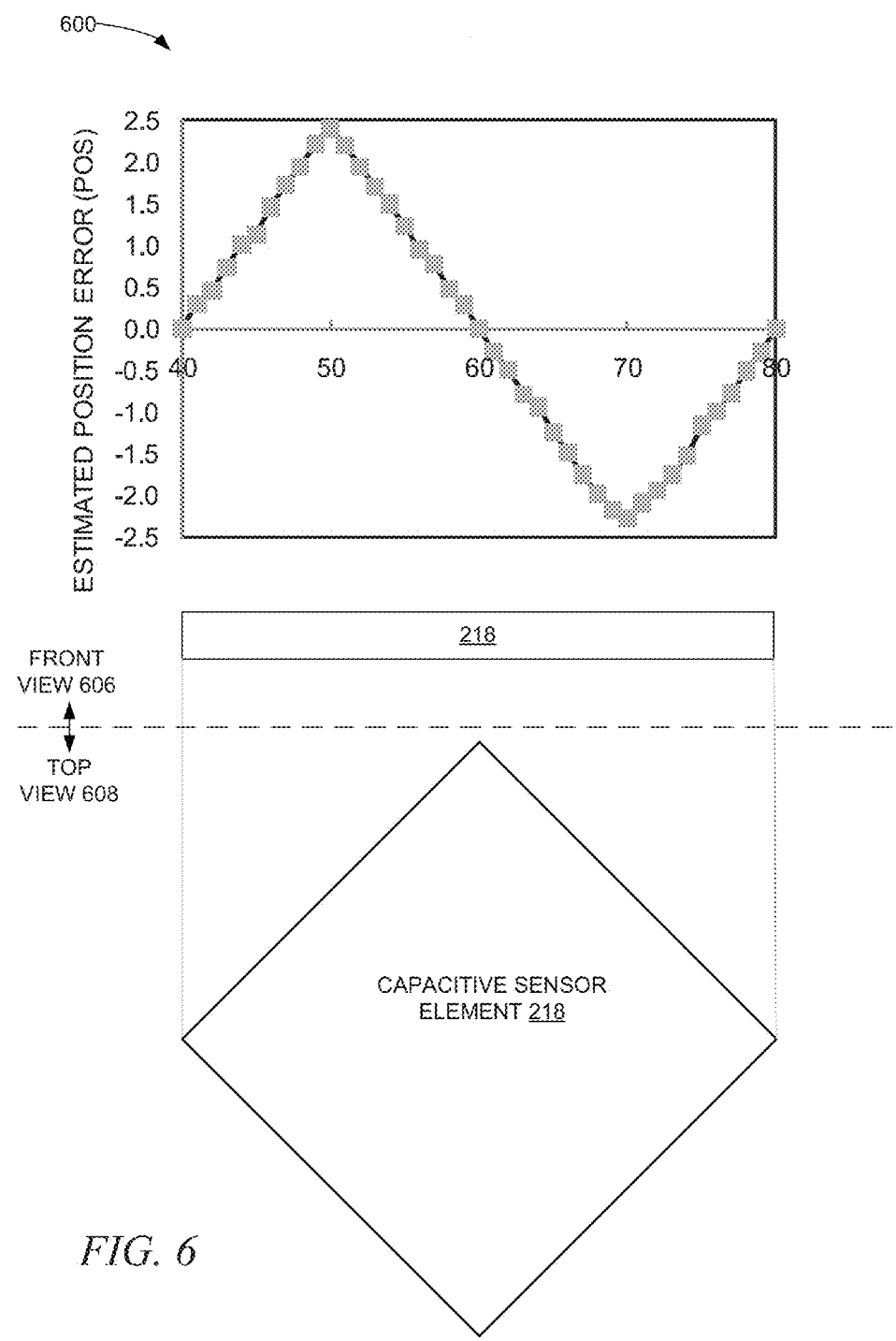
FIG. 6 is graph illustrating a position error profile of a capacitive sensor element, in accordance with various embodiments.

FIG. 6 is graph 600 illustrating a position error profile of a capacitive sensor element, in accordance with various embodiments. By estimating position error associated with each calculated position corresponding to the capacitive sensor element 218, the position error profile shown in the graph 600 for capacitive sensor element 218 can be generated. The front view 606 and the top view 608 of the capacitive sensor element 218 are shown below the graph 600. As will be discussed with respect to FIGS. 7 and 8, a position error profile for one capacitive sensor element may be used as the position error profile for another capacitive sensor element.

The position error profile can be generated using any technique for determining position error. For example, the position error may be determined based on a difference between an average velocity of a conductive object and a velocity of the conductive object at a calculated position. Alternatively or additionally, position error may be determined by finding the difference between calculated positions and reference positions.

The graph 600 shows the amplitude of the estimated position error varying periodically over the calculated positions 40-80. In some embodiments the periodic estimated position error may vary in offset, phase, and/or sign from the waveform shown in FIG. 6. Although the amplitude of the position error is shown to be periodic in this embodiment, it will be noted that in other embodiments of the claimed subject matter, the amplitude of the position error may be non-periodic.

When the position error varies periodically over the calculated positions, a periodic function can be used to approximate the periodic error values. For example, the periodic curve in the graph can be approximated using the sine function, $$A \sin\left(\frac{2 \cdot \pi \cdot x_C}{\text{Pitch}}\right), \quad (3)$$

where A represents the amplitude of the sine function, $X_C$ represents a calculated position of the conductive object, and Pitch represents the number of positions associated with the capacitive sensor element.

The input to the sine function of equation (3) is a calculated position and the output is the estimated position error (e.g., an approximation) associated with that calculated position. The position error estimator 318 may tune the amplitude, A to fit the estimated periodic error value. In an embodiment, the amplitude is proportional to the resolution of the capacitive sensors (e.g., the capacitive sensor elements 216, 218, 220, and 222 of FIG. 3) divided by the active area (e.g., a length of the active area) of the capacitive sensor element. The amplitude may be further tuned with a multiplier that is greater than or less than one. In an embodiment, the position error estimator tunes the periodic function during operation in the field (e.g., when position is estimated based on a difference in average velocity and local velocity, as described above) so that the capacitive sensing system 300 of FIG. 3 can adapt to styli having various different stylus tip diameters.

In an embodiment, the output of the periodic function is organized in a data structure (e.g., a table) in memory to be looked up and applied when a subsequently calculated position is to be modified to compensate for position error. Such a table is discussed with respect to FIG. 8.

FIG. 7 is a graph 700 highlighting a portion of a position error profile, in accordance with an embodiment. Like the graph 600 of FIG. 6, the graph 700 of FIG. 7 shows a position error profile associated with the capacitive sensor element 218. However, the units of the x-axis of the graph 700 are the values of the signal ratio of equation (2) reflecting that the position error associated with the capacitive sensor depends on the signal ratio values calculated at different positions across the capacitive sensor element. As discussed with respect to FIG. 2, FIG. 7 shows that the estimated position error is zero when the signal ratio is equal to −0.5, 0, and 0.5.

When the position error is periodic across the positions of a capacitive sensor element, a repeating portion of the position error values (e.g., the portion 702 indicated with darker shading) can be used to determine the position error at any position along the capacitive sensor element 218. The graph 700 illustrates that each position error value of the portion 702 has a corresponding positive or negative position error value along the capacitive sensor element (e.g., as indicated by a signal ratio value or a calculated position). In an embodiment, corresponding position error values are similar enough in value to use interchangeably. The use of the repeating portion 207 of position error values is described further below with respect to FIG. 8.

Capacitive sensor elements such as those described with respect to FIG. 3 may yield the same or similar signal ratio values in response to interaction with a conductive object at corresponding locations. The signal ratio values of each capacitive sensor may be similar enough that the position error profile of one capacitive sensor element, which depends on the signal ratio, can be used as the position error profile of another capacitive sensor element.

In an embodiment, the signal ratios of the different capacitive sensor elements are the same or similar at corresponding positions because of symmetrical positioning of the capacitive sensor elements relative to one another, their same or similar physical shape and orientation, the constant dimensions of the conductive object that interacts with them, and the common way in which the centroid algorithm uses their signals to calculate position of the capacitive sensor element.

FIG. 8 is a table 800 illustrating signal ratio values associated with a portion of a position error profile, in accordance with an example embodiment. Column 802 is shown to include signal ratio values associated with a capacitive sensor element. Column 804 is shown to include estimated position error values corresponding to the signal ratio values.

The estimated position error values in column 804 represent the portion of position error values 702 shown in FIG. 7. As introduced above, the portion of position error values 702 can be used to determine the position error at any position along the capacitive sensor element 218. In an embodiment, the position adjuster 322 of FIG. 3 uses signal ratio values as an index to obtain corresponding position adjustment values. A signal ratio value received by the position adjuster reflects the conductive object 210 at a position of the capacitive sensor element 218 of FIG. 3 or at a position of another of the capacitive sensor elements 216, 220, or 222 of FIG. 3.

A signal error ratio received by the position adjuster 322 may not be a signal ratio value stored in the memory 320 (e.g., the signal error value may be absent from the table 800) but the position adjuster 322 may use one or more algorithms (not shown) to identify one of the index values in the table 800 that has the same position error value (e.g., an absolute value). If necessary, the position adjuster 322 may also use the one or more algorithms to determine the appropriate sign or difference of the position error value corresponding to the received signal ratio value.

Figure 9:
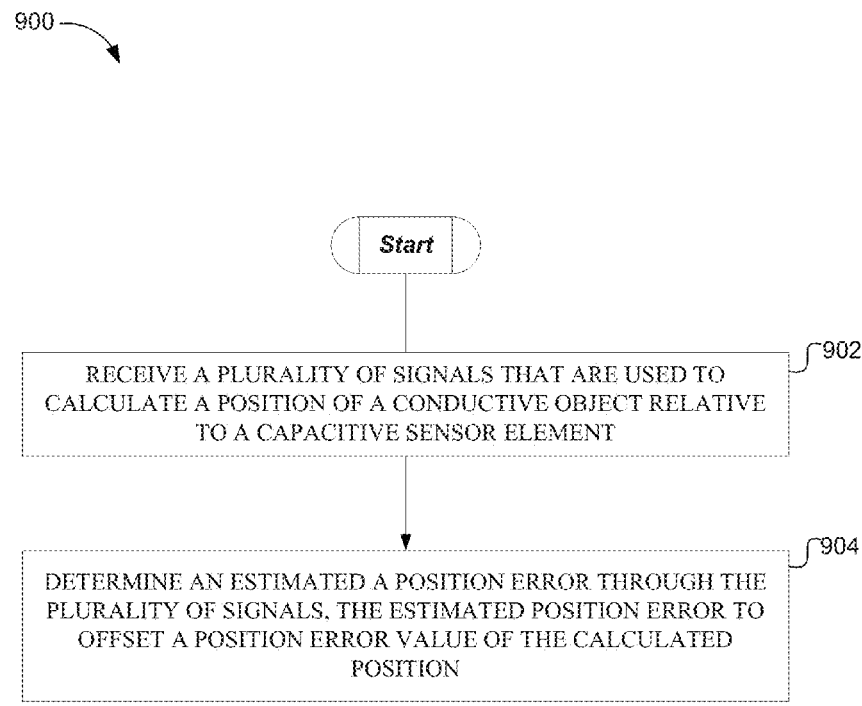
FIG. 9 is a flow diagram illustrating a method for determining an estimated position error, in accordance with various embodiments.

FIG. 9 is a flow diagram illustrating a method 900 for determining an estimated position error, in accordance with various embodiments. A description of the method 800 refers to components of FIG. 3 for the purpose of explanation and not to limit the claimed subject matter. It will be noted that the methods described herein may be performed by hardware, software, or a combination of hardware and software.

At block 902, the method 900 may include the sensing system 314 receiving a plurality of signals $S_R$ 321, $S_P$, 319 and $S_L$ 317 that are used to calculate a position $X_C$ 312 of a conductive object relative to the capacitive sensor element 218. At block 904, the method 900 may include the position adjuster 322 determining an estimated position error through the plurality of signals $S_R$ 321, $S_P$, 319 and $S_L$ 317, the estimated position error to offset a position error value of the calculated position $X_C$ 312.

In various embodiments, the conductive object 210 is a stylus with a stylus tip diameter that is less than 3 millimeters (e.g., 1 millimeter) and is at least five times smaller than a length across an active area of the capacitive sensor elements 216, 218, 220, and 222. In an embodiment, the calculated position $X_C$ 312 includes a position error value that represents a difference between the calculated position $X_C$ 312 of the stylus tip and an actual position of the stylus tip.

The position adjuster 322 is to determine the estimated position error through the signals $S_R$ 321, $S_P$, 319 and $S_L$ 317 and then adjust the calculated position $X_C$ 312 using the estimated position error to offset a position error value of the calculated position $X_C$ 312. The position adjuster 322 may access the memory 320 to obtain the position adjustment value from a data structure using an index value that is based on the plurality of signals $S_R$ 321, $S_P$, 319 and $S_L$ 317. For example, the position adjuster 322 may use the signal ratio value discussed in FIGS. 7 and 8 to locate the estimated position error in column 804.

FIGS. 6 and 7 show a position error profile of the capacitive sensor element 218 of FIG. 3. As described above, the position error profile of one capacitive sensor element (e.g., the capacitive sensor element 218) may be used as the position error profile of another capacitive sensor element (e.g., the capacitive sensor elements 216, 220, or 222 of FIG. 3). For example, the position adjuster 322 of FIG. 3 may receive a plurality of signals associated with another calculated position $X_{C'}$ (not shown) of a stylus tip, the other calculated position $X_{C'}$ relative to the capacitive sensor element 222. Referring to FIG. 7, the position adjuster 322 may use the other plurality of signals to locate a corresponding estimated position error in column 804 of FIG. 8. The position adjuster 322 may then use the estimated position error to adjust the other calculated position $X_{C'}$.

Figure 10:
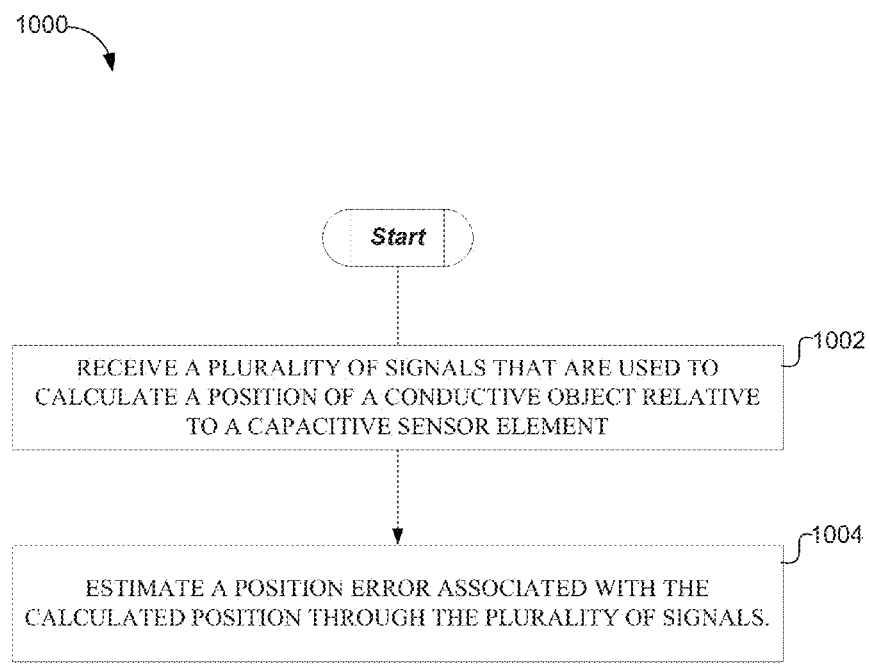
FIG. 10 is a flow diagram illustrating a method for estimating position error associated with a calculated position, in accordance with various embodiments.

FIG. 10 is a flow diagram illustrating a method 1000 for estimating a position error associated with a calculated position, in accordance with various embodiments. A description of the method 1000 refers to components of FIGS. 3 and 4 for the purpose of explanation and not to limit the claimed subject matter. It will be noted that the methods described herein may be performed by hardware, software, or a combination of hardware and software.

At block 1002, the method 1000 may include the sensing system 314 receiving a plurality of signals $S_R$ 321, $S_P$, 319 and $S_L$ 317 used to calculate a position $X_C$ 312 of a conductive object relative to a capacitive sensor element 218. At block 1004, the method 1000 may include the position error estimator 318 estimating a position error associated with the calculated position $X_C$ 312 through the plurality of signals $S_R$ 321, $S_P$, 319 and $S_L$ 317.

Referring to FIG. 3, the position error estimator 318 may obtain or calculate an actual position error that is a difference between an actual position and the calculated position $X_C$ 312. The amount of the actual position error may depend on one or more of the size of the capacitive sensor elements 216, 218, 220, and 222 (e.g., the length of the active area) and the diameter of the conductive object 210 (e.g., the stylus tip diameter). In an embodiment, the actual position is determined through a Cartesian robot that measures position independent of signals from the capacitive sensor elements 216, 218, 220, and 222. In this manner, the actual position error can be determined for multiple calculated positions associated with the capacitive sensor element 218.

Alternatively or additionally, the position error estimator 318 may estimate the position error through calculating a difference between a velocity $V_{X0-XC}$ 427 of the conductive object 210 at the calculated position $X_C$ 312 and an average velocity $X_{AVG}$ 423 of the conductive object 210 over the capacitive sensor element 218. This technique is discussed in more detail with respect to FIG. 11.

When the amplitude of the actual position error varies periodically over the calculated positions, the position error estimator 318 may use a periodic function (e.g., the sine function of equation (3)) to approximate the position error associated with the calculated positions. For example, the periodic function may take as input the calculated position $X_C$ 312 and the period may be equal to the length of an active area of the capacitive sensor element 218. For example, FIG. 6 illustrates a periodic position error over the capacitive sensor element 218 of FIG. 4. The amplitude of the periodic function may be proportional to a number of positions associated with the capacitive sensor element (e.g., the pitch of the capacitive sensor element 218), and a length of the capacitive sensor element (e.g., a length of an active area of the capacitive sensor element).

Regardless of the how the position error estimator 318 determines the estimated position error, the position error estimator 318 may place the estimated position error values in the memory 320 of FIG. 3. FIG. 8 shows an example of estimated position error values organized in the table 800. The position error estimator 318 may provide a calculated position or signal ration of equation (2) as the index in column 802 to the stored estimated position errors in column 804.

When the estimated position error is periodic over the capacitive sensor element 218, one quarter of the estimated position error values can be stored in the memory 320 rather than all of the estimated position error values.

The position adjuster 322 may use the index value to retrieve the estimated position error associated with a calculated position $X_C$ 312 and adjust the calculated position $X_C$ 312 accordingly to compensate for position error.

In an embodiment, the position error estimator 318 may avoid storing estimated position error values by calculating the estimated position error "on the fly." For example, when the position calculator reports the calculated position $X_C$ 312, the position error estimator may use the calculated position $X_C$ 312 as input to compute, in real time, the sine function of equation (3) tuned to estimate the position error. The position adjuster 322 may then apply the estimated position error the calculated position $X_C$ 312.

Figure 11:
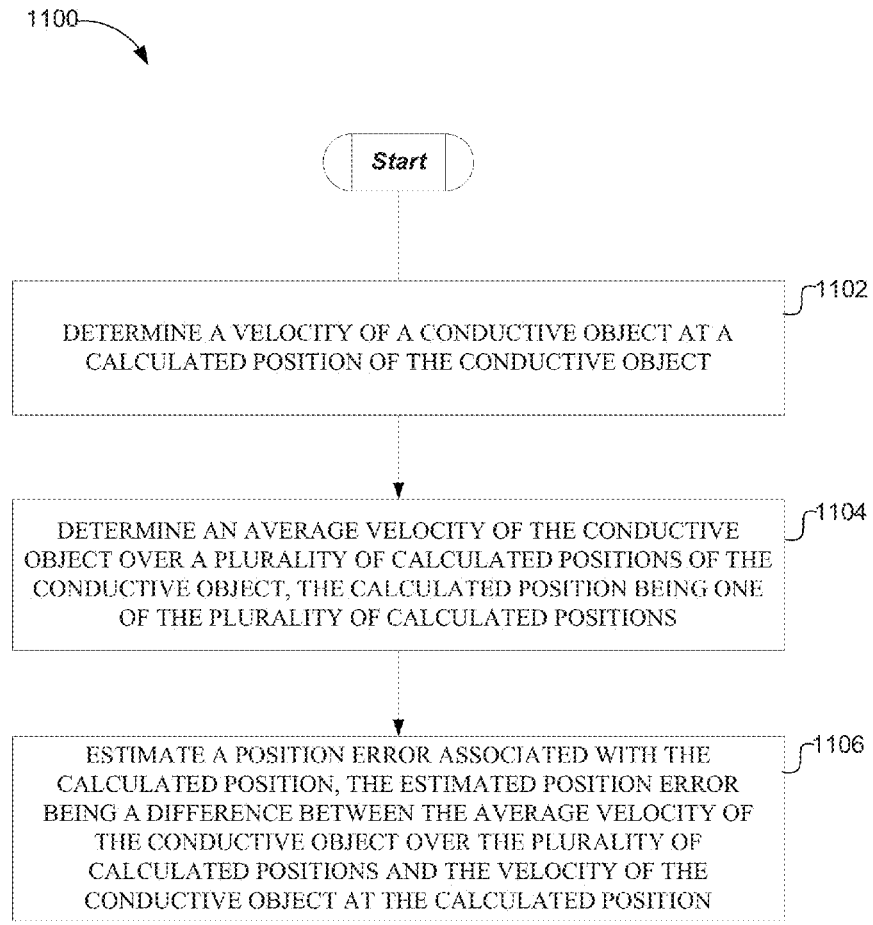
FIG. 11 is a flow diagram illustrating a method for estimating position error associated with a calculated position, in accordance with an example embodiment.

FIG. 11 is a flow diagram illustrating a method 1100 for estimating a position error associated with a calculated position, in accordance with an example embodiment. A description of the method 1100 refers to components of FIG. 4 for the purpose of explanation and not to limit the claimed subject matter. It will be noted that the methods described herein may be performed by hardware, software, or a combination of hardware and software.

At block 1102, the method 1100 may include the position error estimator 318 determining a velocity $V_{X0\text{-}XC}$ 427 of the conductive object 210 at a calculated position $X_C$ 312. At block 1104, the method 1100 may include the position error estimator 318 determining an average velocity $V_{AVG}$ 423 of the conductive object 210 over a plurality of calculated positions.

In an embodiment, the method 1100 may include a host (not shown) prompting a user to move the conductive object 210 across the capacitive sensor elements 216, 218, 220, and 222. The position error estimator 318 may track the time it takes the conductive object 210 to move between the calculated positions and use those values to determine the average velocity $V_{AVG}$ 423 and the velocity $V_{X0\text{-}XC}$ 427 of the conductive object 210 at the calculated position $X_C$ 312.

At block 1106, the method 1100 may include the position error estimator 318 estimating a position error associated with the calculated position $X_C$ 312. In an embodiment, the estimated position error is the difference between the average velocity $X_{AVG}$ 423 of the conductive object 210 over the plurality of calculated positions and the velocity $V_{X0\text{-}XC}$ 427 of the conductive object 210 at the calculated position $X_C$ 312.

Figure 12:
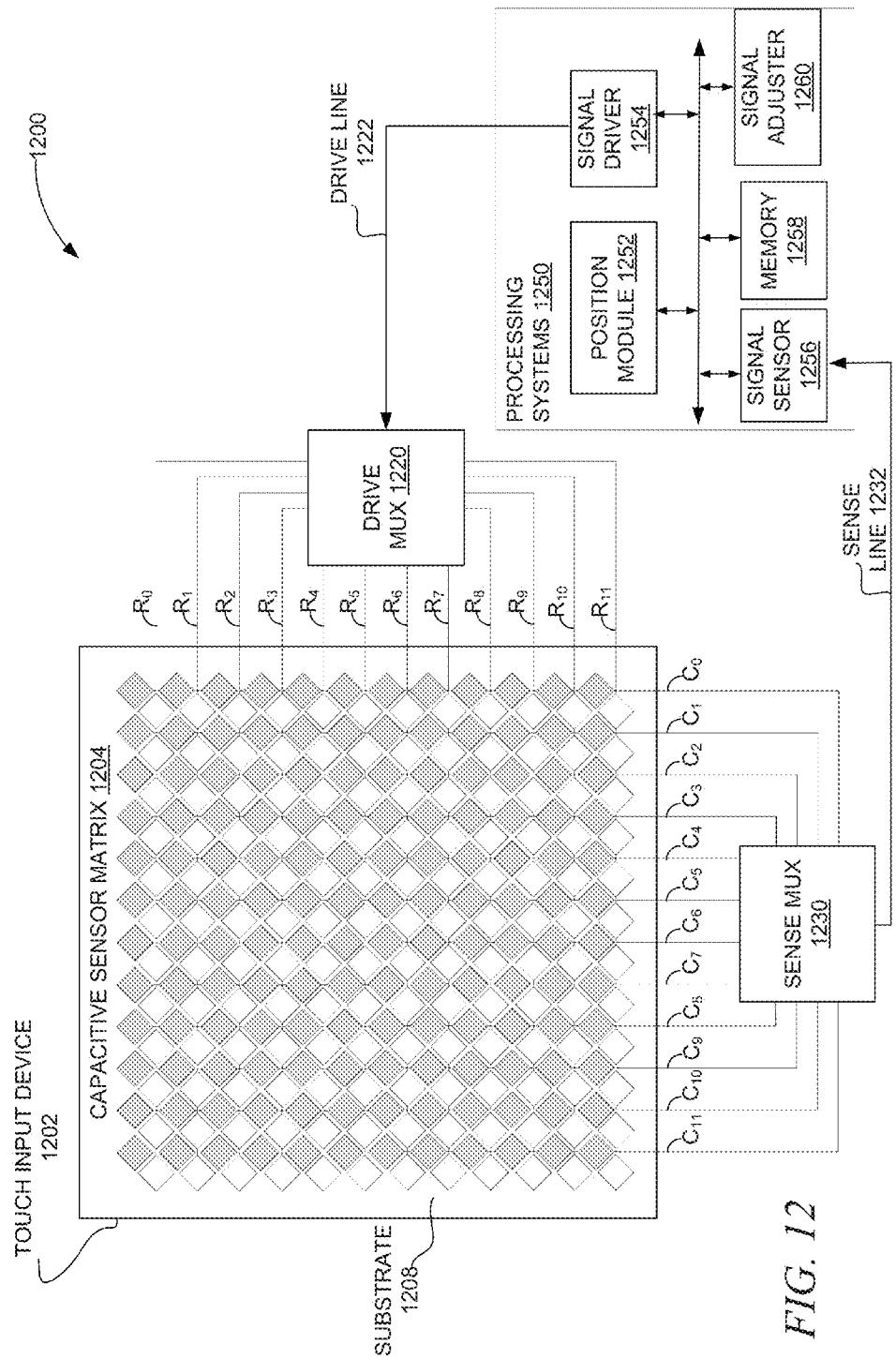
FIG. 12 is a block diagram illustrating an example capacitive sensing system, in accordance with various embodiments.

FIG. 12 is a block diagram illustrating an example capacitive sensing system 1200, in accordance with various embodiments. The capacitive sensing system 1200 is shown to include a touch input device 1202 coupled with a processing device 1250. The touch input device 1202 may be, for example, a touch-sensor pad, a touch-screen display, a touch-sensor slider, a touch-sensor button, or other device.

The touch input device 1202 is shown to include a capacitive sensor matrix 1204 residing upon a substrate 1208. The example substrate 1208 may have a relatively low conductivity compared to electronic components that reside on the substrate 1208. In an embodiment, the capacitive sensor elements of the capacitive sensor matrix 1204 are formed from ITO. An ITO layer including the capacitive sensor elements may be positioned over a display area (e.g., in a touch-screen display) and protected with a protective layer.

The capacitive sensor matrix 1204 is shown to include capacitive sensor elements arranged in rows and columns (e.g., defining a two-dimensional grid) that can be used to detect the proximity, touch, position, and/or movement of a conductive object (e.g., a stylus).

The rows of capacitive sensor elements in the capacitive sensor matrix 1204 are shown to be coupled to row traces $R_0$-$R_{11}$, which are shown to be coupled with the processing device 1250 through a drive multiplexer (MUX) 1220 and a drive line 1222. The columns of capacitive sensor elements in capacitive sensor matrix 1204 are shown to be coupled to column traces $C_0$-$C_{11}$, which are shown to be coupled with the processing device 1250 through the sense MUX 1230 and a sense line 1232.

The processing device 1250 is shown to include a signal driver 1254, a signal sensor 1256, a signal adjuster 1260, a position module 1252, and a memory 1258. Various embodiments of the processing device 1250 are described below with respect to FIG. 16. The position module may provide the functionality of the position calculator, the position error estimator, and the position adjuster described with respect to FIGS. 3 and 4. In various embodiments, the signal driver 1254, signal sensor 1256, and/or the position module 1252 are implemented with hardware, software, or a combination of the two.

The position module 1252 is to measure changes in capacitance associated with the capacitive sensor elements of the capacitive sensor matrix 1204. It will be noted that the position module 1252 may use any of various known methods for measuring capacitance. By way of example and not limitation, the position module 1252 may use relaxation oscillator methods, provide current versus voltage phase shift measurements, measure resistor-capacitor charge timing, and/or utilize a capacitance bridge divider, charge transfer, successive approximation, sigma-delta modulation, charge-accumulation circuits, field effect, mutual capacitance, self capacitance, a combination of mutual capacitance and self-capacitance, and/or frequency shift techniques.

For some embodiments, the position module 1252 may direct the operation of the signal driver 1254 and the signal sensor 1256 through control signals. As described below with respect to FIG. 13, the signal driver 1254 and the signal sensor 1256 may scan different groups of capacitive sensor elements of the capacitive sensor matrix at different times.

The signal driver 1254 is to provide a portion of a scan operation that includes energizing capacitive sensor elements of the capacitive sensor matrix 1204. For some embodiments, the signal driver 1254 may energize the capacitive sensor elements through a scanning current.

The signal sensor 1256 is to provide a portion of the scan operation that includes obtaining a signal from energized capacitive sensor elements that may be used to represent an actual capacitance of the energized capacitive sensor elements. For some embodiments, the signal adjuster 1260 may apply a correction value to the signal to reduce the effect of error in the signal on measured capacitance or calculated position of the conductive object. The position module 1252 may compare the actual capacitance of the energized capacitive elements with an expected capacitance to determine whether a conductive object is proximate to or in contact with capacitive sensor elements of the capacitive sensor matrix 1204. The position module may calculate a position of the conductive object based on the signal and use the signal to determine and/or remove position error in the calculated position, as described herein.

In an embodiment, the capacitive sensing system 1200 operates using a mutual capacitance sensing technique, where a mutual capacitance may be formed at the intersection of two capacitive sensor elements in the capacitive sensor matrix 1204. A conductive object proximate to the intersection may cause a change in this mutual capacitance. The change in capacitive may be measured by the position module 1252. The position module 1252 or another module and/or circuit may use the measured change in capacitance to determine a location or position of the conductive object relative to the capacitive sensor matrix 1204.

In an embodiment of mutual capacitance sensing, the capacitive sensor elements oriented along a row may be driven by the signal driver 1254 with a current through the drive line 1222, the drive MUX 1220, and a selected row trace of the drive traces $R_0$-$R_{11}$. The capacitive sensor elements oriented along a column may be sensed by the signal sensor 1256 through the sense line 1232, the sense MUX 1230, and a selected column trace of the column traces $C_0$-$C_{11}$. In an embodiment, the processing device 1250 controls the drive MUX 1220 to distribute energizing current from the signal driver 1254 to an appropriate row of capacitive sensor elements. Likewise, the processing device 1250 may control the sense MUX 1230 to retrieve the sensing current from the appropriate column of the capacitive sensing matrix 1204. The designation of rows and columns to include the driven and sensed capacitive sensor elements is merely one example, and in other embodiments, the designation may be reversed.

Figure 13:
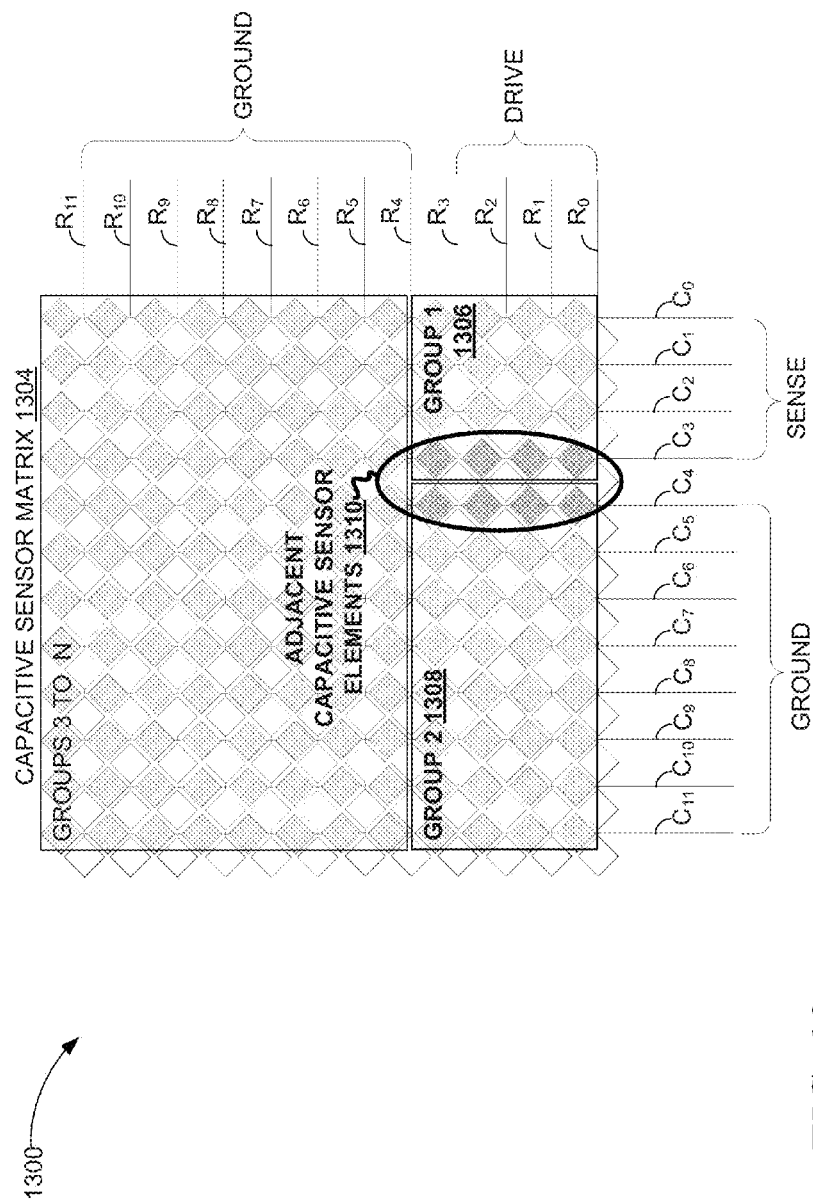
FIG. 13 is a block diagram illustrating multiple scan groups of a capacitive sensor matrix, in accordance with an embodiment.

FIG. 13 is a block diagram 1300 illustrating multiple scan groups of a capacitive sensor matrix 1304, in accordance with an embodiment. As described with respect to FIG. 12, the signal driver 1254 drives capacitive sensors so that the signal sensor 1256 can receive a signal that reflects the capacitance of a capacitive sensor element at a given time. The signal sensor 1256 may receive signals from the capacitive sensor elements sequentially or in parallel.

In an embodiment, the capacitive sensor elements of the capacitive sensor matrix 1304 are organized into group 1 1306 and group 2 1308. The signal driver 1254 and the signal sensor 1256 of FIG. 12 may scan the capacitive sensor elements of group 1 1306 at a different time from when they scan the capacitive sensor elements of group 2 1308. When the signal driver 1254 and the signal sensor 1256 of FIG. 12 scan the capacitive sensors in group 1 1306, the capacitive sensors in group 2 1308 are grounded. Likewise, the capacitive sensors in group 1 1306 are grounded while the signal driver 1254 and the signal sensor 1256 of FIG. 12 scan the capacitive sensors in group 2 1308. Thus, when the capacitive sensor elements of group 1 1306 are being sensed, the adjacent capacitive sensor elements of group 2 1308 are held at ground and vice versa.

It has been found that the adjacent capacitive sensor elements 1310, when scanned in separate groups as described above, provide relatively larger signals to reflect a capacitance than non-adjacent capacitive sensors do. In an embodiment, this inconsistency in signals becomes even more pronounced when a conductive object used to provide input has the small end diameter (e.g., less than 3 millimeters) relative to the larger capacitive sensor element (e.g., with a length greater than 5 millimeters). Since the capacitance of the capacitive sensor elements is used to calculate position of the conductive object, the larger signals of the adjacent capacitive sensor elements 1310 can lead to position calculation error.

Referring to FIG. 12, the signal adjuster 1260 is to adjust the signals from the adjacent capacitive sensor elements 1310 when they are scanned in different groups 1306, 1308 at different times. The signal adjuster 1260 may apply a signal adjustment value to reduce the value of the signals from the adjacent capacitive sensor elements 1310 so that they are more consistent with the signals from the non-adjacent capacitive sensor elements. Alternatively or additionally, the signal adjuster 1260 may adjust signals from capacitive sensor elements in different scan groups that are not adjacent to one another.

For some embodiments, the signal adjuster 1260 may use a different signal adjustment value for different capacitive sensor elements. For example, the signal adjuster 1260 may use one signal adjustment value to adjust signals from capacitive sensors in group 1 1306 and another signal adjustment value to adjust signals from capacitive sensors in group 2 1308. The signal adjustment values may be stored in the memory 1258 and available for access by the signal adjuster 1260.

The signal adjustment value may be greater than or less than one. The adjustment value may be selected based on physical characteristics of the touch input device 1202 of FIG. 12, the capacitive sensor elements of the capacitive sensor matrix 1304 of FIG. 13, the number of capacitive sensor elements, the number and configuration of groups of capacitive sensor elements, the operations for scanning the capacitive sensor elements, the physical characteristics of a conductive object used to provide input, and/or other factors that affect signal values of the capacitive sensor elements.

FIG. 14 is a chart showing experimental results of position error associated with a two-millimeter stylus when a signal adjustment factor has been applied to signals.

The chart illustrates experimental results of applying a signal adjustment value to signals of capacitive sensor elements residing in adjacent scan groups or zones. A stylus with a 2 millimeter stylus tip was used to provide input to five millimeter capacitive sensor elements, each having 40 positions. The results show that when the signals were multiplied by a signal adjustment value of 1.05 for x-direction signals and 1.17 for y-direction signals the average position error decreased to 0.34 millimeters from 0.5 millimeters of average position error without the signal adjustment value. This represents around 32% change in position accuracy. It should be noted that signal adjustment values can be used to improve position accuracy not only for the configuration described above, but also for other configurations.

FIG. 15 is a chart showing experimental results of position error associated with multiple stylus diameters when estimated position errors have been applied to calculated positions. The chart illustrates experimental results of using the estimated position error values to adjust calculated positions of a five millimeter capacitive sensor element having 40 positions. The experiment was performed with stylus' having diameters of 1.5 millimeters, 2 millimeters, 2.5 millimeters, and 3 millimeters. The styluses were used to provide input to internal capacitive sensor elements that did not reside on an edge of the panel. The sine function of equation (3) with amplitude of 0.3 millimeters was used to estimate the actual error determined through a Cartesian robot. It should be noted that estimated position error can be used to improve position accuracy not only for configurations described above, but also for other configurations.

For the 1.5 millimeter stylus tip, the results show that when estimated position error was used to adjust calculated positions the average actual position error was 0.306 millimeters as compared to 0.49 millimeters of average actual position error when estimated position error was not used to adjust calculated positions. This represents around 37.6% difference in position accuracy.

For the 2 millimeter stylus tip, the results show that when estimated position error was used to adjust calculated positions the average actual position error was 0.269 millimeters as compared to 0.465 millimeters of average actual position error when estimated position error was not used to adjust calculated positions. This represents around 42.2% difference in position accuracy.

For the 2.5 millimeter stylus tip, the results show that when estimated position error was used to adjust calculated positions the average actual position error was 0.245 millimeters compared to 0.468 millimeters of average actual position error when estimated position error was not used to adjust calculated positions. This represents around 47.6% difference in position accuracy.

For the 3 millimeter stylus tip, the results show that when estimated position error was used to adjust calculated positions the average actual position error was 0.18 millimeters as compared 0.337 millimeters of average actual position error when estimated position error was not used to adjust calculated positions. This represents around 46.6% difference in position accuracy.

Figure 16:
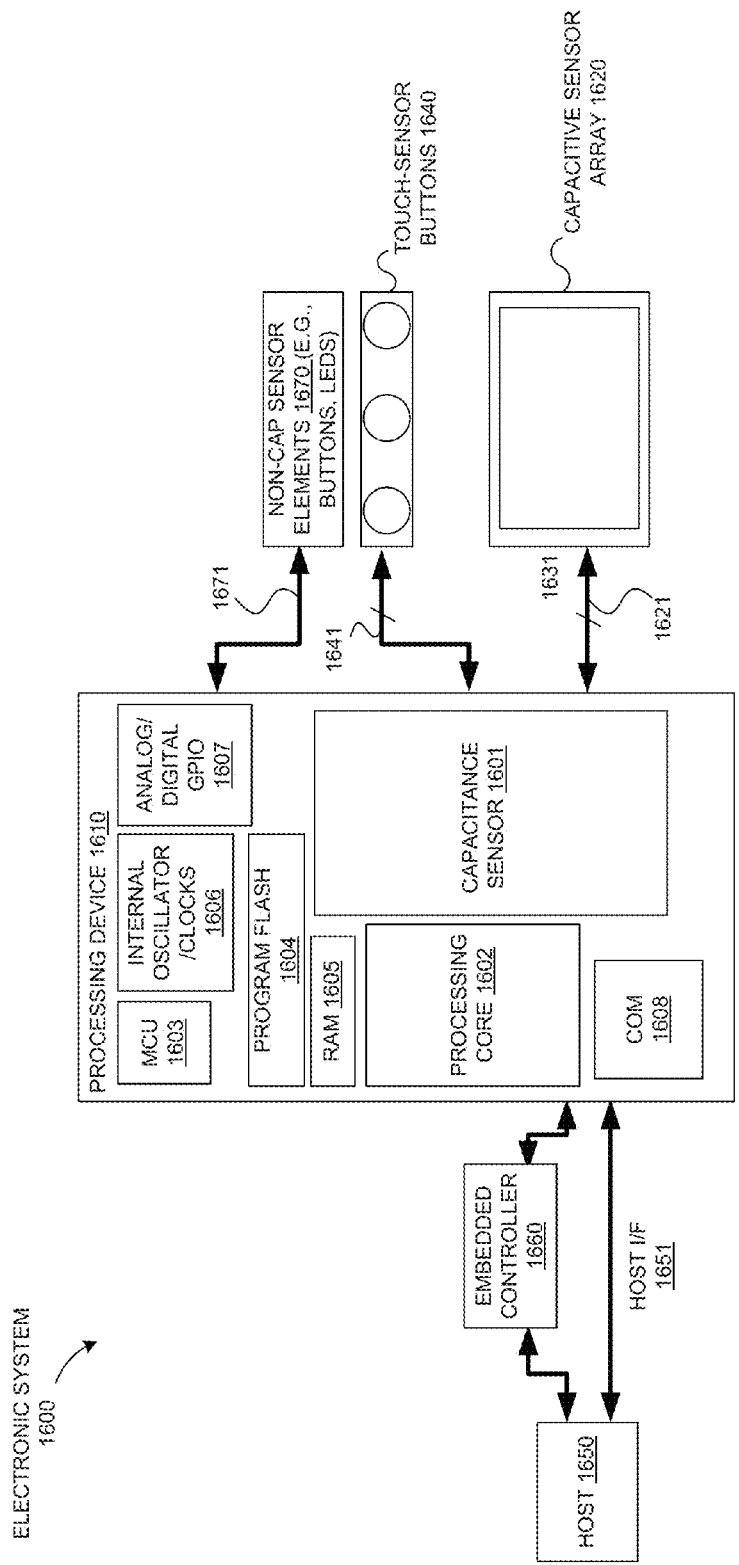
FIG. 16 is a block diagram illustrating an example machine, in accordance with various embodiments.

FIG. 16 is a block diagram illustrating one embodiment of an electronic system 1600 having a processing device for detecting a presence of a conductive object on a capacitive sensor array 1620 according to embodiments. Electronic system 1600 includes processing device 1610, capacitive sensor array 1620, touch-sensor buttons 1640, host processor 1650, embedded controller 1660, and non-capacitance sensor elements 1670. The processing device 1610 may include analog and/or digital general purpose input/output ("GPIO") ports 1607. GPIO ports 1607 may be programmable. The digital block array may be configured to implement a variety of digital logic circuits (e.g., DACs, digital filters, or digital control systems) using, in one embodiment, configurable user modules ("UMs"). The digital block array may be coupled to a system bus. Processing device 1610 may also include memory, such as random access memory ("RAM") 1605 and program flash 1604. RAM 1605 may be static RAM ("SRAM"), and program flash 1604 may be a non-volatile storage, which may be used to store firmware (e.g., control algorithms executable by processing core 1602 to implement operations described herein). Processing device 1610 may also include a microcontroller unit ("MCU") 1603 coupled to memory and the processing core 1602.

As illustrated, capacitance sensor 1601 may be integrated into processing device 1610. Capacitance sensor 1601 may include analog I/O for coupling to an external component, such as capacitive sensor array 1620, touch-sensor buttons 1640, and/or other devices. Capacitance sensor 1601 and processing device 1610 are described in more detail below.

The embodiments described herein can be used in any capacitive sensor array application, for example, the capacitive sensor array 1620 may be a touch screen, a touch-sensor slider, or touch-sensor buttons 1640 (e.g., capacitance sensor buttons). In one embodiment, these sense devices may include one or more capacitive sensor elements. The operations described herein may include, but are not limited to, notebook pointer operations, lighting control (dimmer), volume control, graphic equalizer control, speed control, or other control operations requiring gradual or discrete adjustments. It should also be noted that these embodiments of capacitive sense implementations may be used in conjunction with non-capacitive sensor elements 1670, including but not limited to pick buttons, sliders (ex. display brightness and contrast), scroll-wheels, multi-media control (ex. volume, track advance, etc) handwriting recognition and numeric keypad operation.

In one embodiment, the electronic system 1600 includes a capacitive sensor array of sensor elements coupled to the processing device 1610 via bus 1621. In an embodiment, the capacitive sensor array may include capacitive sensor elements 104 of FIG. 1, such as the capacitive sensor elements 216, 218, 220, and 222 of FIG. 2. The capacitive sensor array of the sensor elements 1620 may include a one-dimensional sensor array in one embodiment and a two dimensional sensor array in another embodiment. The capacitive sensor matrix 1204 of FIG. 12 is an example of a two dimensional sensor array. Alternatively, the capacitive sensor array of the sensor elements may have more dimensions. Also, in one embodiment, the capacitive sensor array of the sensor elements 1620 may be sliders, touchpads, touch screens or other sensing devices. In another embodiment, the electronic system 1600 includes touch-sensor buttons 1640 coupled to the processing device 1610 via bus 1641. Touch-sensor buttons 1640 may include a single-dimension or multi-dimension sensor array. The single- or multi-dimension sensor array may include multiple sensor elements. For a touch-sensor button, the sensor elements may be coupled together to detect a presence of a conductive object over the entire surface of the sense device. Alternatively, the touch-sensor buttons 1640 may have a single sensor element to detect the presence of the conductive object. In one embodiment, touch-sensor buttons 1640 may include a capacitive sensor element. Capacitive sensor elements may be used as non-contact sensor elements. These sensor elements, when protected by an insulating layer, offer resistance to severe environments.

The electronic system 1600 may include any combination of one or more of the capacitive sensor array 1620, and/or touch-sensor button 1640. In another embodiment, the electronic system 1600 may also include non-capacitance sensor elements 1670 coupled to the processing device 1610 via bus 1671. The non-capacitance sensor elements 1670 may include buttons, light emitting diodes ("LEDs"), and other user interface devices, such as a mouse, a keyboard, or other functional keys that do not require capacitance sensing. In one embodiment, busses 1671, 1641, 1631, and 1621 may be a single bus. Alternatively, these buses may be configured into any combination of one or more separate buses.

Processing device 1610 may include internal oscillator/clocks 1606 and communication block ("COM") 1608. The oscillator/clocks block 1606 provides clock signals to one or more of the components of processing device 1610. Communication block 1608 may be used to communicate with an external component, such as a host processor 1650, via host interface ("I/F") line 1651. Alternatively, processing device 1610 may also be coupled to the embedded controller 1660 to communicate with the external components, such as host processor 1650. In one embodiment, the processing device 1610 is configured to communicate with the embedded controller 1660 or the host processor 1650 to send and/or receive data.

Processing device 1610 may reside on a common carrier substrate such as, for example, an integrated circuit ("IC") die substrate, a multi-chip module substrate, or the like. Alternatively, the components of processing device 1610 may be one or more separate integrated circuits and/or discrete components. In one exemplary embodiment, processing device 1610 may be the Programmable System on a Chip ("PSoC®") processing device, developed by Cypress Semiconductor Corporation, San Jose, Calif. Alternatively, processing device 1610 may be one or more other processing devices known by those of ordinary skill in the art, such as a microprocessor or central processing unit, a controller, special-purpose processor, digital signal processor ("DSP"), an application specific integrated circuit ("ASIC"), a field programmable gate array ("FPGA"), or the like.

It should also be noted that the embodiments described herein are not limited to having a configuration of a processing device coupled to a host, but may include a system that measures the capacitance on the sense device and sends the raw data to a host computer where it is analyzed by an application. In effect, the processing that is done by processing device 1610 may also be done in the host.

It is noted that the processing device 1610 of FIG. 16 may measure capacitance using various techniques, such as self-capacitance sensing and mutual capacitance sensing. The self-capacitance sensing mode is also called single-electrode sensing mode, as each sensor element needs only one connection wire to the sensing circuit. For the self-capacitance sensing mode, touching the sensor element increases the sensor capacitance as added by the finger touch capacitance is added to the sensor capacitance. The mutual capacitance change is detected in the mutual capacitance-sensing mode. Each sensor element uses at least two electrodes: one is a transmitter (TX) electrode (also referred to herein as transmitter electrode) and the other is a receiver (RX) electrode. When a finger touches a sensor element or is in close proximity to the sensor element, the capacitive coupling between the receiver and the transmitter of the sensor element is decreased as the finger shunts part of the electric field to ground (e.g., chassis or earth). In an embodiment, the processing device 1610 may include one or more of the position calculator 316, the position error estimator, and the position adjuster 322 as described above with respect to FIGS. 3 and 4. In one embodiment, the processing device 1610 includes the position module 1252 and/or the signal adjuster 1260 of FIG. 12.

Capacitance sensor 1601 may be integrated into the IC of the processing device 1610, or alternatively, in a separate IC. The capacitance sensor 1601 may include relaxation oscillator (RO) circuitry, a sigma delta modulator (also referred to as CSD) circuitry, charge transfer circuitry, charge accumulation circuitry, or the like, for measuring capacitance as would be appreciated by one of ordinary skill in the art having the benefit of this disclosure. Alternatively, descriptions of capacitance sensor 1601 may be generated and compiled for incorporation into other integrated circuits. For example, behavioral level code describing capacitance sensor 1601, or portions thereof, may be generated using a hardware descriptive language, such as VHDL or Verilog, and stored to a machine-accessible medium (e.g., CD-ROM, hard disk, floppy disk, etc.). Furthermore, the behavioral level code can be compiled into register transfer level ("RTL") code, a netlist, or even a circuit layout and stored to a machine-accessible medium. The behavioral level code, the RTL code, the netlist, and the circuit layout all represent various levels of abstraction to describe capacitance sensor 1601.

It should be noted that the components of electronic system 1600 may include only some or all the discrete components described above, or some combination thereof.

In one embodiment, electronic system 1600 is used in a notebook computer. Alternatively, the electronic device may be used in other applications, such as a mobile handset, a personal data assistant ("PDA"), a keyboard, a television, a remote control, a monitor, a handheld multi-media device, a handheld video player, a handheld gaming device, or a control panel.

Methods and apparatus to determine position error of a calculated position have been described. Although the claimed subject matter has been described with reference to specific embodiments, it will be evident that various modifications and changes may be made to these embodiments without departing from the broader spirit and scope of what is claimed. Accordingly, the specification and drawings are to be regarded in an illustrative rather than a restrictive sense.

In this document, the terms "a" or "an" are used, as is common in patent documents, to include one or more than one. In this document, the term "or" is used to refer to a nonexclusive or, such that "A or B" includes "A but not B," "B but not A," and "A and B," unless otherwise indicated. In the event of inconsistent usages between this document and those documents so incorporated by reference, the usage in the incorporated reference(s) should be considered supplementary to that of this document; for irreconcilable inconsistencies, the usage in this document controls.

The above description is intended to be illustrative, and not restrictive. For example, the above-described embodiments (or one or more aspects thereof) may be used in combination with each other. Other embodiments will be apparent to those of skill in the art upon reviewing the above description. The scope of the claims should, therefore, be determined with reference to the appended claims, along with the full scope of equivalents to which such claims are entitled. In the appended claims, the terms "including" and "in which" are used as the plain-English equivalents of the respective terms "comprising" and "wherein." Also, in the following claims, the terms "including" and "comprising" are open-ended; a system, device, article, or process that includes elements in addition to those listed after such a term in a claim are still deemed to fall within the scope of that claim. Moreover, in the following claims, the terms "first," "second," and "third," etc. are used merely as labels and are not intended to impose numerical requirements on their objects.

The Abstract of the Disclosure is provided to comply with 37 C.F.R. §1.72(b), requiring an abstract that will allow the reader to quickly ascertain the nature of the technical disclosure. It is submitted with the understanding that it will not be used to interpret or limit the scope or meaning of the claims.

What is claimed is:

1. A method comprising:
    receiving a plurality of signals that are used to calculate a position of a conductive object relative to a capacitive sensor element;
    estimating a position error through the plurality of signals based on a determined velocity of the conductive object at the calculated position and a determined average velocity of the conductive object over a plurality of calculated positions of the conductive object that includes the calculated position, wherein the estimated position error is based on the difference between the average velocity of the conductive object over the plurality of calculated positions and the velocity of the conductive object at the calculated position; and
    adjusting the calculated position using the estimated position error to at least partially offset the position error of the calculated position.

2. The method of claim 1, wherein at least one of the plurality of signals reflects a capacitance of the capacitive sensor element when the conductive object is proximate to an active area of the capacitive sensor element, wherein a length across the active area of the capacitive sensor element is at least five times larger than a diameter of the conductive object.

3. The method of claim 1, further comprising using the estimated position error to estimate another position error associated with another calculated position of the conductive object relative to another capacitive sensor element.

4. The method of claim 1, further comprising adjusting each of the plurality of signals with a signal adjustment value to offset a signal error value of each of the plurality of signals, wherein the determining of the estimated position error through the plurality of signals includes determining the estimated position error through the adjusted plurality of signals.

5. The method of claim 1, wherein the position error of the calculated position reflects a difference between the calculated position of the conductive object relative to the capacitive sensor element and an actual position of the conductive object relative to the capacitive sensor element.

6. The method of claim 1, wherein the adjusting of the calculated position using the estimated position error to offset the position error of the calculated position includes one of adding to and subtracting from the calculated position using the estimated position error.

7. The method of claim 1, further comprising:
receiving another plurality of signals associated with another calculated position of the conductive object, the other calculated position relative to another capacitive sensor element;
using the other plurality of signals to access the estimated position error; and
adjusting the other calculated position with the estimated position error.

8. An apparatus comprising:
a position calculator configured to:
calculate a position of a stylus tip based on signals from a plurality of capacitive sensor elements;
determine a velocity of the stylus tip at the calculated position;
determine an average velocity of the stylus tip over a plurality of calculated positions of the stylus tip, the calculated position being one of the plurality of calculated positions; and
estimate a position error associated with the calculated position based on a difference between the average velocity of the stylus tip over the plurality of calculated positions and the velocity of the stylus tip at the calculated position, wherein the position error associated with the calculated position reflects a difference between the calculated position of the stylus tip relative to the capacitive sensor elements and an actual position of the conductive object relative to the capacitive sensor elements; and
a position adjuster configured to adjust the calculated position using the estimated position error.

9. The apparatus of claim 8, wherein the stylus tip has a diameter that is at least five times smaller than a length across an active area of at least one capacitive sensor element of the plurality of capacitive sensor elements.

10. The apparatus of claim 9, wherein diameter of the stylus tip is less than 3 millimeters in length.

11. The apparatus of claim 8, wherein the signals from the plurality of capacitive sensor elements reflect capacitances of the plurality of capacitive sensor elements formed through a stylus shaft of a stylus and the stylus tip of the stylus.

12. A method comprising:
receiving a plurality of signals used to calculate a position of a conductive object relative to a capacitive sensor element; and
estimating a position error associated with the calculated position through the plurality of signals by:
determining a velocity of the conductive object at the calculated position of the conductive object;
determining an average velocity of the conductive object over a plurality of calculated positions of the conductive object, the calculated position being one of the plurality of calculated positions; and
estimating the position error associated with the calculated position based on a difference between the average velocity of the conductive object over the plurality of calculated positions and the velocity of the conductive object at the calculated position, wherein the estimating of the position error is responsive to a user placing the conductive object at the calculated position during a field use of a touchscreen that includes the capacitive sensor element.

13. The method of claim 12, wherein the determining of the velocity of the conductive object at the calculated position and the determining of the average velocity of the conductive object over the plurality of calculated positions comprises:
prompting a user to move the conductive object proximate to a capacitive sensor element;
calculating the plurality of calculated positions of the conductive object relative to the capacitive sensor element; and
timing the movement of the conductive object through the calculated positions.

14. The method of claim 12, further comprising estimating another position error associated with another calculated position through another plurality of signals by calculating an output of a periodic function, the periodic function having the other calculated position as an input and an amplitude that is proportional to a number of positions associated with the capacitive sensor element, and a length of the capacitive sensor element, wherein the output of the periodic function is the other estimated position error.

15. The method of claim 12, further comprising organizing the other estimated position error in a data structure such that the other estimated position error is accessible through an index value associated with the other calculated position.

16. The method of claim 15, further comprising:
receiving the other calculated position of the conductive object;
using the other calculated position as the index value to access, in the data structure, the other estimated position error associated with the other calculated position.

17. The method of claim 16, further comprising removing the other estimated position error from the other calculated position.

18. The method of claim 15, further comprising:
receiving the index value;
using the index value to access, in the data structure, the other estimated position error associated with the other calculated position, wherein the other calculated position of the conductive object is associated with one capacitive sensor element; and
removing the other estimated position error from yet another calculated position of the conductive object, wherein yet the other calculated position is associated with yet another capacitive sensor element.

19. The method of claim 12, further comprising estimating the position error associated with the calculated position through the plurality of signals before the field use of the touchscreen.

* * * * *